(12) United States Patent
Tsou et al.

(10) Patent No.: US 8,450,396 B2
(45) Date of Patent: May 28, 2013

(54) EFFICIENT MIXING PROCESS FOR PRODUCING THERMOPLASTIC ELASTOMER COMPOSITION

(75) Inventors: Andy Haishung Tsou, Allentown, PA (US); Yuichi Hara, Hiratsuka (JP); Michael Kenneth Lyon, Houston, TX (US); Yoshihiro Soeda, Hiratsuka (JP)

(73) Assignees: ExxonMobil Chemical Patents Inc., Houston, TX (US); The Yokohama Rubber Co., Ltd., Tokyo (JP)

( * ) Notice: Subject to any disclaimer, the term of this patent is extended or adjusted under 35 U.S.C. 154(b) by 184 days.

(21) Appl. No.: 12/682,490

(22) PCT Filed: Oct. 11, 2007

(86) PCT No.: PCT/US2007/081116
§ 371 (c)(1),
(2), (4) Date: Jul. 9, 2010

(87) PCT Pub. No.: WO2009/048472
PCT Pub. Date: Apr. 16, 2009

(65) Prior Publication Data
US 2010/0331452 A1 Dec. 30, 2010

(51) Int. Cl.
*C08J 3/20* (2006.01)
(52) U.S. Cl.
USPC .......................................................... 523/351
(58) Field of Classification Search
USPC .......................................................... 523/351
See application file for complete search history.

(56) References Cited

U.S. PATENT DOCUMENTS

| | | | |
|---|---|---|---|
| 6,825,281 B2 | 11/2004 | Tse et al. | |
| 7,019,058 B2 | 3/2006 | Wang et al. | |
| 2006/0223941 A1 | 10/2006 | Tsou et al. | |
| 2007/0060684 A1 | 3/2007 | Tsou et al. | |
| 2008/0314493 A1 | 12/2008 | Hara | |

FOREIGN PATENT DOCUMENTS

| | | |
|---|---|---|
| EP | 0722850 B1 | 7/1996 |
| EP | 0857761 A1 | 8/1998 |
| EP | 0922732 A2 | 6/1999 |
| EP | 0969039 A1 | 1/2000 |
| JP | 8-244402 | 9/1996 |
| JP | 10-025375 | 1/1998 |
| JP | 10-036570 A | 2/1998 |
| JP | 10-036571 | 2/1998 |
| JP | 10-114840 | 5/1998 |
| JP | 11-240989 A | 9/1999 |
| JP | 2000-063572 | 2/2000 |
| JP | 2006-077090 A | 3/2006 |
| RU | 2278877 C2 | 6/2006 |
| RU | 2305690 C2 | 9/2007 |
| WO | WO-2004/081108 A1 | 9/2004 |
| WO | WO-2007/050071 A1 | 5/2007 |
| WO | WO-2007/050076 A1 | 5/2007 |
| WO | WO-2007100157 A1 | 9/2007 |
| WO | WO-2007/111584 A1 | 10/2007 |

*Primary Examiner* — Edward Cain
(74) *Attorney, Agent, or Firm* — Novak Druce Connolly Bove + Quigg LLP

(57) ABSTRACT

A durable, flexible, impermeable thermoplastic elastomer composition is produced using a dynamic vulcanization process conducted in a high shear mixer at elevated temperature. The composition comprises cured particles of a first halogenated isobutylene-containing elastomer and particles of a second elastomer having at least one functional group capable of reacting with and grafting to a polyamide, the particles of the first and second elastomers dispersed in a continuous thermoplastic polyamide matrix, said process comprising: (1) dispersing a curative in the halogenated elastomer and forming a pre-compounded, preferably pelletized composition; (2) introducing polyamide resin and optional stabilizers into the mixer and shearing and heating to melt the polyamide and form a mixture; (3) introducing a nylon plasticizer to reduce the viscosity of the polyamide mixture to substantially match that of the pre-compounded elastomer under mixing conditions; (4) introducing pellets of the pre-compounded elastomer into the mixer and initiating dynamic vulcanization of the elastomer and polyamide components; (5) introducing the second elastomer and continuing heating and shearing to disperse the second elastomer and substantially complete dynamic vulcanization; and delivering the thermoplastic elastomer composition from the mixer. Such compositions are particularly useful in applications such as tire innerliners and barrier films or layers.

19 Claims, No Drawings

EFFICIENT MIXING PROCESS FOR PRODUCING THERMOPLASTIC ELASTOMER COMPOSITION

This Application is a National Stage of Application PCT/US2007/081116 filed on Oct. 11, 2007. The entire contents of all are hereby incorporated by reference.

FIELD OF THE INVENTION

The present invention relates to thermoplastic elastomer compositions particularly useful for tire and other industrial rubber applications and particularly to processes for producing such compositions.

BACKGROUND OF THE INVENTION

EP 722 850 B1 discloses a low-permeability thermoplastic elastomer composition that is superior as a gas-barrier layer in pneumatic tires. This thermoplastic elastomer composition comprises a low-permeability thermoplastic matrix, such as polyamide or a blend of polyamides, in which there is dispersed a low-permeability rubber, such as brominated poly (isobutylene-co-paramethylstyrene), typically referred to as BIMS. In EP 857 761 A1 and EP 969 039 A1, the viscosity ratio of the thermoplastic matrix and the dispersed rubber phase was specified both as a function of the volume fraction ratio and, independently, to be close to a value of one in order to produce a high concentration of small particle size vulcanized rubber particles dispersed in a thermoplastic phase. EP 969 039 A1 further discloses that small particle size rubber dispersed in a thermoplastic resin matrix was useful in order to achieve acceptable durability of the resulting composition, particularly where such compositions are intended to be used as innerliners in pneumatic tires. Further improvements in the technology for producing thermoplastic elastomer compositions useful for industrial applications are described by the inventors herein and others in US Published Applications 2006/0223941 and 2007/0060684, incorporated herein by reference.

Compositions exhibiting low gas permeability performance (i.e., functioning as a gas barrier) composed of thermoplastic resin/thermoplastic resin-based blends such as a high density polyethylene resin and nylon 6 or nylon 66 (HDPE/PA6/PA66), a polyethylene terephthalate and aromatic nylon (PET/MXD6), a polyethylene terephthalate and vinyl alcohol-ethylene copolymer (PET/EVOH), where one thermoplastic resin is layered over the other layer to form plural layers by molding, and processes for producing the same, are disclosed. Further, an application regarding the use of such a composition as the innerliner layer of a tire is disclosed in Japanese Patent Application No. 7-55929 (i.e., JP-A-7-55929). However, since these materials are thermoplastic resin/thermoplastic resin blends, while they are superior in gas barrier performance, they lack flexibility, and therefore, such films are subject to failure if they are used in a vehicle tire which is subject to significant stress and flexing.

Further, there are also examples of the use of a thermoplastic elastomer composed of a rubber and a thermoplastic resin for use as an innerliner or in a tire; see, Japanese Patent Application No. 8-183683 (i.e., JP-A-8-183683), but in general, a flexible material of the type disclosed therein and having superior durability has low heat resistance. With a thermoplastic elastomer using a thermoplastic resin having a melting point less than the tire vulcanization temperature as a matrix, when the tire vulcanization bladder is released at the end of the tire vulcanization cycle, the tire inside surface is subject to appearance defects due to the thermoplastic resin sticking to or rubbing against the vulcanization bladder.

Control of the viscosity difference between the rubber and resin during mixing in order to reduce the particle size of the dispersed rubber has been reported by S. Wu, Polym. Eng. Sci., 27(5), 1987. Wu reported that the dispersed rubber particle size was reduced where the ratio of melt viscosities of the rubber/resin is brought close to 1, that is, when their viscosities are equal. However, it is reported in EP 969 039 A1 that, in attempting to fabricate a thermoplastic elastomer composition having sufficient flexibility, strength and elongation, as well as superior durability, by increasing the rubber content, and keeping the ratio of melt viscosities of the rubber/resin at 1, the rubber becomes the continuous matrix and such compositions containing vulcanized rubber no longer exhibit thermoplasticity.

In Japanese Patent Application Nos. 8-193545, 9-175150, and 10-235386 (i.e., JP-A-8-193545, JP-A-9-175150, and JP-A-10-235386, respectively), it is proposed that, in a laminate structure in which dynamic fatigue resistance is required, such as in a tire or a hose, when using a gas permeation preventive thermoplastic elastomer composition composed of rubber/resin dispersed therein, it is known to obtain a balance between the flexibility and gas permeation preventive property by making use of a blend of flexible N11- or N12-nylon and the superior gas permeation preventive property of N6- or N66-nylon. Further, it was proposed to define volume fraction and melt viscosity using the following equation, defined as alpha:

$$(\phi_d/\phi_m) \times (\eta_m/\eta_d) < 1.0$$

wherein the volume fractions of the continuous or matrix phase component and dispersed phase component in the thermoplastic elastomer composition are $\phi_m$ and $\phi_d$ respectively, and the melt viscosities of the matrix and dispersed phase components are $\eta_m$ and $\eta_d$ respectively, and further to bring the ratio of viscosities $\eta_m/\eta_d$ close to 1 to reduce the dispersed rubber particle size domain in order to improve the durability. However, it is reported in EP 969 039 A1 that the durability at low temperatures was insufficient by just reducing the rubber particle size.

Thus the limitations of the prior approaches to achieving improved performance of the desirable compositions comprising a small particle size rubber domain dispersed in a thermoplastic matrix, the composition exhibiting improved gas or fluid barrier properties and desirable levels of strength and durability suitable for use in tires and hose applications suggest that there is a continuing need for improvements, as have been accomplished by use of the processes of the present invention.

SUMMARY OF THE INVENTION

A durable, flexible, impermeable thermoplastic elastomer composition is produced using a dynamic vulcanization process conducted in a suitable mixer capable of applying shear to polymer components at elevated temperature for producing a thermoplastic elastomer composition, said composition comprising dispersed particles of at least one first elastomer comprising halogenated isobutylene-containing elastomer and dispersed particles of at least one second elastomer having at least one functional group capable of reacting with and grafting to a polyamide, said particles of said at least one first and at least one second elastomers dispersed in a continuous thermoplastic nylon resin matrix comprising at least one polyamide selected from the group consisting of nylon homopolymers, and nylon copolymers, said process comprising the steps of: (1) dispersing, in said halogenated elastomer, at least one curing agent or cure system suitable for crosslinking said halogenated elastomer to obtain a pre-compounded halogenated elastomer composition using shear conditions, mixing time and a temperature sufficient to substantially uniformly disperse said curing agent or cure system, but insufficient to cause substantial crosslinking of said elastomer that would prevent its subsequent flow and dispersion when added to nylon under conditions of elevated temperature and shear; (2) introducing said at least one nylon and optionally at least one nylon thermal stabilizer or oxidative stabilizer or light stabilizers or combination of them, into said mixer and applying sufficient shear and heat to cause the nylon to melt and said optional stabilizer to be dispersed in said nylon and form a nylon mixture; (3) introducing at least one nylon plasticizer in an amount sufficient to cause the viscosity of said nylon mixture to substantially match the viscosity of said pre-compounded halogenated elastomer at the temperature and under the shear conditions present in said mixer; (4) introducing said pre-compounded halogenated elastomer into said mixer and applying heat and shear in sufficient quantity to initiate dynamic vulcanization of said halogenated elastomer; and (5) introducing said second elastomer and continuing the heating and shearing to substantially disperse said second elastomer and substantially complete said dynamic vulcanization of said halogenated elastomer; and delivering said dynamically vulcanized thermoplastic elastomer composition from said mixer.

In a preferred embodiment and in connection with pre-compounding, the pre-compounded halogenated elastomer is pelletized and the pellets are cooled for convenience of controlled feeding of the pre-compounded mixture.

The dynamic vulcanization process is preferably conducted in a twin-screw mixing extruder under controlled conditions of heat and shear with each of the elastomer(s) and other components of the composition introduced into the extruder at positions along the extruder screw to allow for optimum reaction and dispersion of the components in the nylon matrix. The first elastomer or rubber is preferably introduced after plasticization of the nylon component(s) and before introduction of the second elastomer or rubber. The process efficiently produces a dynamically vulcanized composition having a preferred morphology including stable, small particles of vulcanized elastomer.

DETAILED DESCRIPTION

Preferred applications of the present invention relate to a thermoplastic elastomer compositions for tire innerliner and barrier films, more particularly to thermoplastic elastomer compositions exhibiting excellent durability and impermeability to fluids such as air, as well as to liquids. Preferred compositional features are directed to enhanced or maximized content of dispersed halogenated, preferably brominated, isobutylene elastomers in the form of vulcanized particles dispersed in a continuous polyamide thermoplastic matrix. Additionally, particularly preferred aspects of the invention relate to efficient mixing processes suitable for producing a thermoplastic elastomer composition capable of providing a rubber domain comprising small sized particles while such domains are also highly extensible and elastic. Furthermore, the invention includes processes for producing pneumatic tires and hoses using the above compositions. The preferred elastomer exhibits low-permeability and is preferably a polymer such as halogenated isobutylene-containing elastomers and particularly preferred are brominated elastomers, especially brominated paramethylstyrene-co-isobutylene polymers; especially preferred are bromobutyl elastomers exhibiting high content of the structure illustrated hereinafter below; and also preferred are commercial bromobutyl elastomers, or blends thereof with one or more of the aforementioned brominated elastomers with one another or with other polymers.

As used herein, the new numbering scheme for the Periodic Table Groups are as disclosed in Chemical and Engineering News, 63(5), 27 (1985). All molecular weights are weight average unless otherwise noted.

Throughout the entire specification, including the claims, the following terms shall have the indicated meanings:

Comprise or comprising: the word "comprise" and variations of the word, such as "comprising" and "comprises," as well as "have," "having," "includes," "include" and "including," and variations thereof, means that the named process steps, components, elements or materials to which it refers are essential, but other steps, components, elements or materials may be added and still form a construct within the scope of the claim or disclosure. When recited in describing the invention and in a claim, it means that the invention and what is claimed is considered to be what follows and potentially more. These terms, particularly when applied to claims, are inclusive or open-ended and do not exclude additional, unrecited components, elements or materials, or methods steps. For purposes of Australian patent law the term "comprising" is to be considered synonymous with the term "including."

Consisting essentially of: In the present context, "consisting essentially of" is meant to exclude any element or combination of elements as well as any amount of any element or combination of elements that would alter the basic and novel characteristics of the invention. Thus, by way of example and not by way of limitation, a thermoplastic elastomer composition produced using a process that did not include dynamic vulcanization would be excluded.

Substantially: For purposes of the present invention, unless otherwise defined with respect to a specific property, characteristic or variable, the term "substantially" as applied to any criteria, such as a property, characteristic or variable, means to meet the stated criteria in such measure such that one skilled in the art would understand that the benefit to be achieved, or the condition or property value desired is met.

Polymer may be used to refer to homopolymers, copolymers, interpolymers, terpolymers, etc. Likewise, a copolymer may refer to a polymer comprising at least two monomers, optionally with other monomers.

When a polymer is referred to as comprising a monomer, the monomer is present in the polymer in the polymerized form of the monomer or in the derivative form the monomer. However, for ease of reference the phrase "comprising the (respective) monomer" or the like is used as shorthand. Likewise, when catalyst components are described as comprising neutral stable forms of the components, it is well understood by one skilled in the art, that the active form of the component is the form that reacts with the monomers to produce polymers.

Isoolefin refers to any olefin monomer having two substitutions on the same carbon.

Multiolefin refers to any monomer having two double bonds. In a preferred embodiment, the multiolefin is any monomer comprising two conjugated double bonds such as a conjugated diene like isoprene.

Elastomer or elastomers as used herein, refers to any polymer or composition of polymers consistent with the ASTM D1566 definition. The terms may be used interchangeably with the term "rubber(s)."

Alkyl refers to a paraffinic hydrocarbon group which may be derived from an alkane by dropping one or more hydrogens from the formula, such as, for example, a methyl group ($CH_3$), or an ethyl group ($CH_3CH_2$), etc.

Aryl refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5$.

Substituted refers to at least one hydrogen group by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, tert-butyl, isopropyl, isobutyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptyloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromomethyl, 2,2-difluoroethyl, 3,3-dichloropropyl, 3,3-difluoropropyl, 4,4-dichlorobutyl, 4,4-difluorobutyl, trichloromethyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, p-ethylstyrene, etc.

The present invention comprises at least one halogenated isobutylene-containing rubber. Typically, it is present in a composition with a thermoplastic resin described hereinbelow, in a weight ratio of rubber to resin of about 55/45 to 80/20; preferably about 60/40 to about 75/25; more preferably about 65/35 to about 75/25. Halogenated rubber is defined as a rubber having at least about 0.1 mole % halogen, such halogen selected from the group consisting of bromine, chlorine and iodine. Preferred halogenated rubbers useful in this invention include halogenated isobutylene-based homopolymers or copolymers. These polymers can be described as random copolymer of a $C_4$ to $C_7$ isomonoolefin derived unit, such as isobutylene derived unit, and at least one other polymerizable unit. In one embodiment of the invention, the halogenated isobutylene-based copolymer is a butyl-type rubber or branched butyl-type rubber, especially brominated versions of these elastomers. (Useful unsaturated butyl rubbers such as homopolymers and copolymers of olefins or isoolefins and other types of elastomers suitable for the invention are well known and are described in Rubber Technology 209-581 (Maurice Morton ed., Chapman & Hall 1995), The Vanderbilt Rubber Handbook 105-122 (Robert F. Ohm ed., R.T. Vanderbilt Co., Inc. 1990), and Edward Kresge and H. C. Wang in 8 Kirk-Othmer Encyclopedia of Chemical Technology 934-955 (John Wiley & Sons, Inc. 4th ed. 1993)).

Butyl rubbers are typically prepared by reacting a mixture of monomers, the mixture having at least (1) a $C_4$ to $C_{12}$ isoolefin monomer component such as isobutylene with (2) a multiolefin, monomer component. The isoolefin is in a range from 70 to 99.5 wt % by weight of the total monomer mixture in one embodiment, and 85 to 99.5 wt % in another embodiment. The multiolefin component is present in the monomer mixture from 30 to 0.5 wt % in one embodiment, and from 15 to 0.5 wt % in another embodiment. In yet another embodiment, from 8 to 0.5 wt % of the monomer mixture is multiolefin. The isoolefin is preferably a $C_4$ to $C_{12}$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in EP 0 279 456 and U.S. Pat. Nos. 5,506,316 and 5,162,425. Other polymerizable monomers such as styrene and dichlorostyrene are also suitable for homopolymerization or copolymerization in butyl rubbers. One embodiment of the butyl rubber polymer useful in the invention is obtained by reacting 95 to 99.5 wt % of isobutylene with 0.5 to 8 wt % isoprene, or from 0.5 wt % to 5.0 wt % isoprene in yet another embodiment. Butyl rubbers and methods of their production are described in detail in, for example, U.S. Pat. Nos. 2,356,128, 3,968,076, 4,474,924, 4,068,051 and 5,532,312.

Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 2,631,984, 3,099,644, 4,288,575, 4,554,326, 4,632,963, 4,681,921, 4,650,831, 4,384,072, 4,513,116 and 5,681,901. In one embodiment, the butyl rubber is halogenated in hexane diluent at from 4 to 60° C. using bromine ($Br_2$) or chlorine ($Cl_2$) as the halogenation agent. Post-treated halogenated butyl rubber can also be used, as disclosed in U.S. Pat. No. 4,288,575. The halogenated butyl rubber typically has a Mooney Viscosity of about 20 to about 70 (ML 1+8 at 125° C.); for example, about 25 to about 55 in another embodiment. The halogen content is typically about 0.1 to 10 wt % based on the weight of the halogenated butyl rubber; for example, about 0.5 to 5 wt %; alternatively, about 0.8 to about 2.5 wt %; for example, about 1 to about 2 wt %. A particularly preferred form of halogenated butyl rubber contains a high content of the following halogenated structure, where X represents the halogen and, in a particularly preferred embodiment, the halogen is bromine; alternatively the halogen is chlorine:

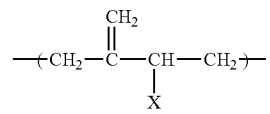

A commercial embodiment of a halogenated butyl rubber useful in the present invention is Bromobutyl 2222 (ExxonMobil Chemical Company). Its Mooney Viscosity is typically about 27 to 37 (ML 1+8 at 125° C., ASTM 1646, modified), and its bromine content is about 1.8 to 2.2 wt % relative to the Bromobutyl 2222. Furthermore, the cure characteristics of Bromobutyl 2222 as provided by the manufacturer are as follows: MH about 28 to 40 dN m, ML is about 7 to 18 dN m (ASTM D2084). Another commercial embodiment of the halogenated butyl rubber useful in the present invention is Bromobutyl 2255 (ExxonMobil Chemical Company). Its Mooney Viscosity is about 41 to 51 (ML 1+8 at 125° C., ASTM D1646), and its bromine content is about 1.8 to 2.2 wt %. Furthermore, its cure characteristics as disclosed by the manufacturer are as follows: MH is from 34 to 48 dN·m, ML is from 11 to 21 dN·m (ASTM D2084). Commercial isobutylene polymers are described in detail by R. N. Webb, T. D. Shaffer and A. H. Tsou, "Commercial Isobutylene Polymers," Encyclopedia OF Polymer Science and Technology, 2002, John Wiley & Sons, incorporated herein by reference.

Another useful embodiment of halogenated butyl rubber is halogenated, branched or "star-branched" butyl rubber. These rubbers are described in, for example, EP 0 678 529 B1, U.S. Pat. Nos. 5,182,333 and 5,071,913, each incorporated herein by reference. In one embodiment, the star-branched butyl rubber ("SBB") is a composition comprising butyl rubber and a polydiene or block copolymer. For purposes of the present invention, the method of forming the SBB is not a limitation. The polydienes, block copolymer, or branching agents (hereinafter "polydienes"), are typically cationically reactive and are present during the polymerization of the butyl or halogenated butyl rubber, or can be blended with the butyl rubber to form the SBB. The branching agent or polydiene can be any suitable branching agent, and the invention is not limited to the type of polydiene or branching agent used to make the SBB.

In one embodiment, the SBB is a composition of butyl or halogenated butyl rubber as described above and a copolymer of a polydiene and a partially hydrogenated polydiene selected from the group consisting of styrene, polybutadiene, polyisoprene, polypiperylene, natural rubber, styrene-butadiene rubber, ethylene-propylene diene rubber (EPDM), ethylene-propylene rubber (EPM), styrene-butadiene-styrene and styrene-isoprene-styrene block copolymers. Polydienes can be present, based on the total monomer content in wt %, typically greater than 0.3 wt %; alternatively, about 0.3 to about 3 wt %; or about 0.4 to 2.7 wt %.

Preferably the branched or "star-branched" butyl rubber used herein is halogenated. In one embodiment, the halogenated star-branched butyl rubber ("HSBB") comprises a butyl rubber, either halogenated or not, and a polydiene or block copolymer, either halogenated or not. The halogenation process is described in detail in U.S. Pat. Nos. 4,074,035, 5,071,913, 5,286,804, 5,182,333 and 6,228,978. The present invention is not limited by the method of forming the HSBB. The polydiene/block copolymer, or branching agents (hereinafter "polydienes"), are typically cationically reactive and are present during the polymerization of the butyl or halogenated butyl rubber, or can be blended with the butyl or halogenated butyl rubber to form the HSBB. The branching agent or polydiene can be any suitable branching agent, and the invention is not limited by the type of polydiene used to make the HSBB.

In one embodiment, the HSBB is typically a composition comprising halogenated butyl rubber as described above and a copolymer of a polydiene and a partially hydrogenated polydiene selected from the group consisting of styrene, polybutadiene, polyisoprene, polypiperylene, natural rubber, styrene-butadiene rubber, ethylene-propylene diene rubber, styrene-butadiene-styrene and styrene-isoprene-styrene block copolymers. Polydienes can be present, based on the total monomer content in wt %, typically greater than about 0.3 wt %, alternatively about 0.3 to 3 wt %, or about 0.4 to 2.7 wt %.

A commercial embodiment of HSBB useful in the present invention is Bromobutyl 6222 (ExxonMobil Chemical Company), having a Mooney Viscosity (ML 1+8 at 125° C., ASTM D1646) of about 27 to 37, and a bromine content of about 2.2 to 2.6 wt %. Further, cure characteristics of Bromobutyl 6222, as disclosed by the manufacturer, are as follows: MH is from 24 to 38 dN·m, ML is from 6 to 16 dN·m (ASTM D2084).

Preferred isoolefin/para-alkylstyrene copolymers include random copolymers comprising a $C_4$ to $C_7$ isoolefin, such as isobutylene, and a halomethylstyrene. The halomethylstyrene may be an ortho-, meta-, or para-alkyl-substituted styrene. In one embodiment, the halomethylstyrene is a p-halomethylstyrene containing at least 80%, more preferably at least 90% by weight of the para-isomer. The "halo" group can be any halogen, desirably chlorine or bromine, most preferably bromine. The copolymer may also include functionalized interpolymers wherein at least some of the alkyl substituent groups present on the styrene monomer units contain benzylic halogen or another functional group described further below. These interpolymers are herein referred to as "isoolefin copolymers comprising a halomethylstyrene" or simply "isoolefin copolymer."

Preferred isoolefin copolymers can include monomers selected from the group consisting of isobutylene or isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. Preferred isoolefin copolymers may also further comprise multiolefins, preferably a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in EP 279456 and U.S. Pat. Nos. 5,506,316 and 5,162,425. Desirable styrenic monomers in the isoolefin copolymer include styrene, methylstyrene, chlorostyrene, methoxystyrene, indene and indene derivatives, and combinations thereof.

Preferred isoolefin copolymers may be characterized as interpolymers containing the following monomer units randomly spaced along the polymer chain:

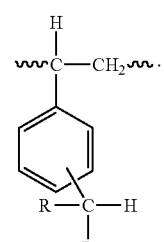

1

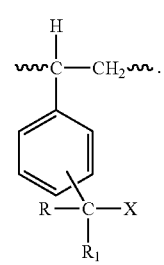

2 wherein R and $R^1$ are independently hydrogen, lower alkyl, preferably $C_1$ to $C_7$ alkyl and primary or secondary alkyl halides and X is a functional group such as halogen. Desirable halogens are chlorine, bromine or combinations thereof. Preferably R and $R^1$ are each hydrogen. The —$CRR_1H$ and —$CRR_1X$ groups can be substituted on the styrene ring in either the ortho, meta, or para positions, preferably the para position. Up to 60 mole % of the p-substituted styrene present in the interpolymer structure may be the functionalized structure (2) above in one embodiment, and in another embodiment from 0.1 to 5 mol %. In yet another embodiment, the amount of functionalized structure (2) is from 0.4 to 1 mol %. The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization and cure are more particularly disclosed in U.S. Pat. No. 5,162,445.

Most useful of such copolymers of isobutylene and p-methylstyrene are those containing from 0.5 to 20 mole % p-methylstyrene wherein up to 60 mole % of the methyl substituent groups present on the benzyl ring contain a bromine or chlorine atom, preferably a bromine atom (p-bromomethylstyrene), as well as acid or ester functionalized versions thereof wherein the halogen atom has been displaced by maleic anhydride or by acrylic or methacrylic acid functionality. These interpolymers are termed "halogenated poly(isobutylene-co-p-methylstyrene)" or "brominated poly(isobutylene-co-p-methylstyrene)", and are commercially available under the name EXXPRO™ Elastomers (ExxonMobil Chemical Company, Houston Tex.). It is understood that the use of the terms "halogenated" or "brominated" are not limited to the method of halogenation of the copolymer, but merely descriptive of the copolymer which comprises the isobutylene derived units, the p-methylstyrene derived units, and the p-halomethylstyrene derived units.

These functionalized polymers preferably have a substantially homogeneous compositional distribution such that at least 95% by weight of the polymer has a p-alkylstyrene content within 10% of the average p-alkylstyrene content of the polymer. More preferred polymers are also characterized by a narrow molecular weight distribution (Mw/Mn) of less than 5, more preferably less than 2.5, a preferred viscosity average molecular weight in the range of about 200,000 to about 2,000,000 and a preferred number average molecular weight in the range of about 25,000 to about 750,000 as determined by gel permeation chromatography.

Preferred halogenated poly(isobutylene-co-p-methylstyrene) polymers are brominated polymers which generally contain from about 0.1 to about 5 wt % of bromomethyl groups. In yet another embodiment, the amount of bromomethyl groups is about 0.2 to about 2.5 wt %. Expressed another way, preferred copolymers contain about 0.05 to about 2.5 mole % of bromine, based on the weight of the polymer, more preferably about 0.1 to about 1.25 mole % bromine, and are substantially free of ring halogen or halogen in the polymer backbone chain. In one embodiment of the invention, the interpolymer is a copolymer of $C_4$ to $C_7$ isomonoolefin derived units, p-methylstyrene derived units and p-halomethylstyrene derived units, wherein the p-halomethylstyrene units are present in the interpolymer from about 0.4 to about 1 mol % based on the interpolymer. In another embodiment, the p-halomethylstyrene is p-bromomethylstyrene. The Mooney Viscosity (1+8, 125° C., ASTM D1646, modified) is about 30 to about 60 Mooney units.

In another embodiment, the relationship between the triad fraction of an isoolefin and a p-alkylstyrene and the mol % of p-alkylstyrene incorporated into the copolymer is described by the copolymer sequence distribution equation described below and is characterized by the copolymer sequence distribution parameter, m.

$$F=1-\{mA/(1+mA)\}$$

where: m is the copolymer sequence distribution parameter,
A is the molar ratio of p-alkylstyrene to isoolefin in the copolymer and,
F is the p-alkylstyrene-isoolefin-p-alkylstyrene triad fraction in the copolymer.

The best fit of this equation yields the value of m for copolymerization of the isoolefin and p-alkylstyrene in a particular diluent. In certain embodiments, m is from less than 38; alternatively, from less than 36; alternatively, from less than 35; and alternatively, from less than 30. In other embodiments, m is from 1-38; alternatively, from 1-36; alternatively, from 1-35; and alternatively from 1-30. Copolymers having such characteristics are disclosed in WO 2004058825 and WO 2004058835.

In another embodiment, the isoolefin/para-alkylstyrene copolymer is substantially free of long chain branching. For the purposes of this invention, a polymer that is substantially free of long chain branching is defined to be a polymer for which $g'_{vis.avg}$ is determined to be greater than or equal to 0.978, alternatively, greater than or equal to 0.980, alternatively, greater than or equal to 0.985, alternatively, greater than or equal to 0.990, alternatively, greater than or equal to 0.995, alternatively, greater than or equal to 0.998, alternatively, greater than or equal to 0.999, as determined by triple detection size exclusion chromatography (SEC) as described below. Such polymers are also disclosed in WO 2004058825 and WO 2004058835.

In another embodiment, the relationship between the triad fraction of an isoolefin and a multiolefin and the mol % of multiolefin incorporated into the halogenated rubber copolymer is described by the copolymer sequence distribution equation below and is characterized by the copolymer sequence distribution parameter, m.

$$F=mA/(1+mA)^2$$

where: m is the copolymer sequence distribution parameter,
A is the molar ratio of multiolefin to isoolefin in the copolymer and,
F is the isoolefin-multiolefin-multiolefin triad fraction in the copolymer.

Measurement of triad fraction of an isoolefin and a multiolefin and the mol % of multiolefin incorporated into the copolymer is described below. The best fit of this equation yields the value of m for copolymerization of the isoolefin and multiolefin in each diluent. In certain embodiments, m is from greater than 1.5; alternatively, from greater than 2.0; alternatively, from greater than 2.5; alternatively, from greater than 3.0; and alternatively, from greater than 3.5. In other embodiments, m is from 1.10 to 1.25; alternatively, from 1.15 to 1.20; alternatively, from 1.15 to 1.25; and alternatively, m is about 1.20. Halogenated rubbers that have these characteristics are disclosed in WO 2004058825 and WO 2004058835.

In another embodiment, the halogenated rubber is substantially free of long chain branching. For the purposes of this invention, a polymer that is substantially free of long chain branching is defined to be a polymer for which $g'_{vis.avg.}$ is determined to be greater than or equal to 0.978, alternatively, greater than or equal to 0.980, alternatively, greater than or equal to 0.985, alternatively, greater than or equal to 0.990, alternatively, greater than or equal to 0.995, alternatively, greater than or equal to 0.998, alternatively, greater than or equal to 0.999, as determined by triple detection SEC as follows. The presence or absence of long chain branching in the polymers is determined using triple detection SEC. Triple detection SEC is performed on a Waters (Milford, Mass.) 150C chromatograph operated at 40° C. equipped a Precision Detectors (Bellingham, Mass.) PD2040 light scattering detector, a Viscotek (Houston, Tex.) Model 150R viscometry detector and a Waters differential refractive index detector (integral with the 150C). The detectors are connected in series with the light scattering detector being first, the viscometry detector second and the differential refractive index detector third. Tetrahydrofuran is used as the eluent (0.5 ml/min.) with a set of three Polymer Laboratories, Ltd. (Shropshire, United Kingdom) 10 micron mixed-B/LS GPC columns. The instrument is calibrated against 16 narrow polystyrene standards (Polymer Laboratories, Ltd.). Data is acquired with TriSEC software (Viscotek) and imported into WaveMetric's Igor Pro program (Lake Oswego, Oreg.) for analysis. Linear polyisobutylene is used to establish the relationship between the intrinsic viscosity $[\eta]_{linear}$ determined by the viscometry detector) and the molecular weight ($M_w$, determined by the light scattering detector). The relationship between $[\eta]_{linear}$ and $M_w$ is expressed by the Mark-Houwink equation.

$$[\eta]_{linear} = K M_w^\alpha$$

Parameters K and α are obtained from the double-logarithmic plot of intrinsic viscosity against $M_w$, α is the slope, K the intercept. Significant deviations from the relationship established for the linear standards indicate the presence of long chain branching. Generally, samples which exhibit more significant deviation from the linear relationship contain more significant long chain branching. The scaling factor g' also indicates deviations from the determined linear relationship.

$$[\eta]_{sample} = g'[\eta]_{linear}$$

The value of g' is defined to be less than or equal to one and greater than or equal to zero. When g' is equal or nearly equal to one, the polymer is considered to be linear. When g' is significantly less than one, the sample is long chain branched. See e.g. E. F. Casassa and G. C. Berry in "Comprehensive Polymer Science," Vol. 2, (71-120) G. Allen and J. C. Bevington, Ed., Pergamon Press, New York, 1988. In triple detection SEC, a g' is calculated for each data slice of the chromatographic curve. A viscosity average g' or $g'_{vis.avg.}$ is calculated across the entire molecular weight distribution. The scaling factor $g'_{vis.avg.}$ is calculated from the average intrinsic viscosity of the sample:

$$g'_{vis.avg.} = [\eta]_{avg.}/(KM_w^\alpha))$$

Other preferred halogenated elastomers or rubbers include halogenated isobutylene-p-methylstyrene-isoprene copolymer as described in WO 01/21672A1. The halogenated rubbers useful in the fluid permeation prevention layer may be the same or different.

For purposes of the present invention, a useful thermoplastic or engineering resin is defined to be any thermoplastic polymer, copolymer or mixture thereof having a Young's modulus of more than 500 MPa and, preferably, an air permeation coefficient of less than $60 \times 10^{-12}$ cc cm/cm$^2$ sec cm Hg (at 30° C.), and, preferably, a melting point of about 170° C. to about 270° C., including, but not limited to, one or more of the following:

a) polyamide resins: nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 (N6/66/610), nylon MXD6 (MXD6), nylon 6T (N6T), nylon 6/6T copolymer, nylon 66/PP copolymer, nylon 66/PPS copolymer;

b) polyester resins: polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxalkylene diimide diacid/polybutyrate terephthalate copolymer and other aromatic polyesters;

c) polynitrile resins: polyacrylonitrile (PAN), polymethacrylonitrile, acrylonitrile-styrene copolymers (AS), methacrylonitrile-styrene copolymers, methacrylonitrile-styrene-butadiene copolymers;

d) polymethacrylate resins: polymethyl methacrylate, polyethylacrylate;

e) polyvinyl resins (for illustration, not limitation: vinyl acetate (EVA), polyvinyl alcohol (PVA), vinyl alcohol/ethylene copolymer (EVOA), polyvinylidene chloride (PVDC), polyvinyl chloride (PVC), polyvinyl/polyvinylidene copolymer, polyvinylidene chloride/methacrylate copolymer;

f) cellulose resins: cellulose acetate, cellulose acetate butyrate;

g) fluorine resins: polyvinylidene fluoride (PVDF), polyvinyl fluoride (PVF), polychlorofluoroethylene (PCTFE); tetrafluoroethylene/ethylene copolymer (ETFE);

h) polyimide resins: aromatic polyimides);

i) polysulfones;

j) polyacetals;

k) polyactones;

l) polyphenylene oxide and polyphenylene sulfide;

m) styrene-maleic anhydride;

n) aromatic polyketones; and o) mixtures of any and all of a) through n) inclusive as well as mixtures of any of the illustrative or exemplified engineering resins within each of a) through n) inclusive.

For purposes of the present invention, this definition of engineering resin excludes polymers of olefins, such as polyethylene and polypropylene.

Preferred engineering resins include polyamide resins and mixtures thereof; particularly preferred resins include Nylon 6, Nylon 6/66 copolymer, Nylon 11, Nylon 12, Nylon 610, Nylon 612 and their blends. According to an alternative preferred embodiment of the present invention, the thermoplastic elastomer composition may be formulated using a thermoplastic resin component where the nylon resin component comprises Nylon 11 or Nylon 12, and Nylon 6/66 copolymer in a ratio of composition (ratio by weight) of about 10/90 to about 90/10; preferably about 30/70 to about 85/15. Such a thermoplastic elastomer composition based on blended resins can provide a thermoplastic elastomer composition having superior durability and appearance, e.g., of the cured surface of a tire innerliner as well as superior air retention properties, as well as demonstrating a good balance of these properties.

Optionally, other rubbers or elastomers can be used in combination with the halogenated isobutylene-containing elastomer. Such an optional rubber component includes high diene rubbers and their hydrates. High diene content rubbers or elastomers are also referred to as high diene monomer rubber. It is typically a rubber comprising typically at least 50 mole % of a $C_4$-$C_{12}$ diene monomer, typically at least about 60 mole % to about 100 mole %; more preferably at least about 70 mole % to about 100 mole %; more preferably at least about 80 mole % to about 100 mole %. Useful high diene monomer rubbers include homopolymers and copolymers of olefins or isoolefins and multiolefins, or homopolymers of multiolefins. These are well known and are described in Rubber Technology, 179-374 (Maurice Morton ed., Chapman & Hall 1995), and The Vanderbilt Rubber Handbook 22-80 (Robert F. Ohm ed., R.T. Vanderbilt Co., Inc. 1990). Generally, other optional rubbers useful in the present invention include, for example natural rubber (NR), isoprene rubber (IR), epoxylated natural rubber, styrene butadiene rubber (SBR), polybutadiene rubber (BR) (including high cis BR and low cis BR), nitrile butadiene rubber (NBR), hydrogenated NBR, hydrogenated SBR, olefin rubbers (for example, ethylene propylene rubbers (including both EPDM and EPM), maleic acid-modified ethylene propylene rubbers (M-EPM), butyl rubber (IIR), isobutylene and aromatic vinyl or diene monomer copolymers, acrylic rubbers (ACM), ionomers, other halogen-containing rubbers (for example, chloroprene rubbers (CR), hydrin rubbers (CHR), chlorosulfonated polyethylenes (CSM), chlorinated polyethylenes (CM), maleic acid-modified chlorinated polyethylenes (M-CM)), silicone rubbers (for example, methylvinyl silicone rubbers, dimethyl silicone rubbers, methylphenylvinyl silicone rubbers), sulfur-containing rubbers (for example, polysulfide rubbers), fluoro rubbers (for example, vinylidene fluoride rubbers, fluorine-containing vinyl ether-based rubbers, tetrafluoroethylene-propylene rubbers, fluorine-containing silicone rubbers, fluorine-containing phosphagen rubbers), thermoplastic elastomers (for example, styrene-containing elastomers, olefin elastomers, ester elastomers, urethane elastomers, or polyamide elastomers), and their mixtures.

Preferred examples of high diene monomer rubbers include polyisoprene, polybutadiene rubber, styrene-butadiene rubber, natural rubber, chloroprene rubber, acrylonitrile-butadiene rubber and the like, which may be used alone or in combination and mixtures.

Since the thermoplastic resin and the halogenated isobutylene-containing rubber differ significantly in solubility, a further optional compatibilizing ingredient may be useful for the purposes of enhancing compatibility of these polymers. Furthermore, without wishing to be bound by theory, the fine rubber dispersions obtained in the compositions of the present invention may be the result, in part, of chemical reaction(s) between, e.g., benzylic bromine present in RIMS, or allylic halogen in halogenated butyl, and terminal amines in polyamides at the phase boundary between the dispersed rubber particles and the thermoplastic formed during mixing and potentially by modifying, in particular reducing, the surface tension between the rubber and resin components. The occurrence of interfacial reactions during blending and simultaneous reaction of two immiscible polymers can help to avoid coalescence of the small particle size dispersed rubber phase, thereby leading to particularly fine dispersions of the rubber phase. The occurrence of such interfacial reactions has been referred to as "reactive compatibilization" and is described, e.g., in U.S. Pat. Nos. 5,571,864 and 6,469,087, incorporated herein by reference. At the same time, because of the interfacial stability in these reactive compatibilized immiscible systems, phase inversion of the higher concentration, lower viscosity polymer blend component, the rubber phase, is inhibited as a consequence of the stabilizing effect of interfacial compatibilization.

Furthermore, utilizing a secondary rubber component (i.e., a second rubber different from the first (halogenated) rubber component, e.g., BIMS) that is more efficient in reducing low temperature modulus than BIMS can be advantageous for improving low temperature performance of the overall composition. Preferably, the secondary rubber is based on functionalized rubbers exhibiting low glass transition temperatures, Tg, preferably less than $-30°$ C. The low Tg contributes to reduced modulus or softness of the secondary rubber at operating or use temperatures of products containing such rubbers, for example, tire innerliners, of about $-20°$ C. or less.

Suitable functionality includes maleic anhydride, acyllactam, or others that can readily react with amine functionality present in polyamides. The presence of chemically reactive functionality in such rubbers further promotes reactive compatibilization between the secondary rubber and polyamide leading to a small particle size dispersion of the rubber in the polyamide matrix, the particles exhibiting an average particle size of about 1 micron or less; preferably less than about 0.5 micron. The use of such a secondary rubber is disclosed in PCT/US2006/011002, filed Mar. 24, 2006 and incorporated herein by reference. The secondary rubber, dispersed in the polyamide matrix in the form of small particles, as noted, can optionally be cured, crosslinked or vulcanized, partially, substantially or fully, as described with regard to the halogenated or RIMS elastomer. Such crosslinking can be accomplished in the course of dispersing the secondary rubber in the polyamide matrix by using the same dynamic vulcanization method applied to the halogenated elastomer component. If dynamic vulcanization is used, it is also necessary to disperse a suitable curing agent or curing system in the secondary rubber in order to effect vulcanization during mixing and dispersion of the rubber. Alternatively, if the secondary rubber is susceptible to thermal crosslinking, it can be vulcanized by the application of sufficient thermal energy either during mixing and dispersion in a manner corresponding to dynamic vulcanization, or after it is dispersed in the form of small particles by providing sufficient thermal energy to accomplish such crosslinking after dispersion. In any event, it is preferred that the secondary rubber be dispersed in the polyamide matrix in the form of small particles having an average particle size of about 0.1 micron to about 1 micron; for example about 0.1 micron to about 0.75 micron; or about 0.1 micron to about 0.5 micron.

Secondary polymers that function as compatibilizers can include ethylenically unsaturated nitrile-conjugated diene-based high saturation copolymer rubbers (HNBR), epoxylated natural rubbers (ENR), NBR, hydrin rubbers, acryl rubbers and mixtures thereof. Other compatibilizers include copolymers such as those having the structure of both or one of the thermoplastic resin and rubber polymer or a structure of a copolymer having an epoxy group, carbonyl group, halogen group, amine group, maleated group, oxazoline group, hydroxy group, etc. capable of reacting with the thermoplastic resin or rubber polymer. The secondary rubber can be selected based upon the type of the thermoplastic resin polymer and rubber polymer to be mixed. Useful secondary rubbers are selected from the group consisting of maleic anhydride grafted rubbers such as maleic anhydride grafted ABS (acrylonitrile-butadiene-styrene), EPDM (ethylene-propylene-diene rubber), SEBS (styrene-ethylene/butadiene-styrene), and the like and maleated ethylene copolymer rubbers such as maleated ethylene-propylene (EPM), ethylene-butene, ethylene-hexene, ethylene-octene, ethylene-decene, ethylene-propylene-diene (EPDM), ethylene-vinyl acetate, ethylene-methyl acrylate, ethylene-ethyl acrylate, ethylene-acrylic acid, and the like and mixtures thereof. Also potentially useful rubbers include EPDM/styrene, EPDM/acrylonitrile graft copolymer and their maleic acid-modified forms; styrene/maleic acid copolymer; reactive phenoxy thermoplastic resin; and their mixtures.

Examples of useful, preferred functional groups present in the secondary rubber include compounds comprising a carbonyl bond such as carboxylic acids, esters of carboxylic acids, acid anhydrides, di-esters, salts, amides, and imides. Aromatic vinyl compounds, hydrolyzable unsaturated silane compounds, saturated halogenated hydrocarbons, and unsaturated halogenated hydrocarbons may also be used.

Examples of particularly preferred functional groups include, but are not limited, to maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride, and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo[2.2.2]oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA).

In a preferred embodiment, the polymer to be functionalized is grafted with maleic anhydride so the maleic anhydride is covalently bonded to the backbone polymer chain of the polymer. The anhydride functionality grafted onto the polymer may remain as an anhydride, may be oxidized into acid functional groups, and/or may be further reacted by processes known in the art to introduce other functional groups such as amides, amines, alcohols, and the like.

Polymers suitable to make functionalized polymers useful herein include ethylene polymers and propylene polymers. Particularly preferred polymers include polymers of ethylene copolymerized with one or more of propylene, butene, pentene, hexane, heptene, octane, nonene-decene, undecene, dodecene, methyl acrylate, ethyl acrylate, butyl acrylate, pentyl acrylate, hexyl acrylate, octyl acrylate, acrylic acid, methacrylic acid, ethacrylic acid, but acrylic acid, or vinyl acetate. Preferably such ethylene polymers are modified with maleic acid or maleic anhydride. Another class of particularly preferred polymers include polymers of propylene copolymerized with one or more of ethylene, butene, pentene, hexane, heptene, octane, nonene-decene, undecene, dodecene, methyl acrylate, ethyl acrylate, butyl acrylate, pentyl acrylate, hexyl acrylate, octyl acrylate, acrylic acid, methacrylic acid, ethacrylic acid, but acrylic acid, or vinyl acetate. Preferably such propylene polymers are modified with maleic acid or maleic anhydride.

Another class of particularly preferred polymers include polymers of a C4 to C7 isoolefin (such as isobutylene) copolymerized with one or more of isoprene, isobutylene. Preferably such isobutylene polymers are modified with maleic acid or maleic anhydride. Particularly preferred functionalized polymer include maleated copolymers of isobutylene and isoprene, maleated copolymers of isobutylene and paramethylstyrene, maleated halobutyl type copolymers, maleated SBB type copolymers and maleated BIMS type copolymers. Various methods are known in the art that may be used for functionalizing polymers. These include, but are not limited to, selective oxidation, free radical grafting, ozonolysis, epoxidation, and the like.

Preferably, the functionalized polymer comprises maleic anhydride present at a concentration selected from the group consisting of less than about: 50 wt %, 45 wt %, 40 wt %, 35 wt %, 30 wt %, 25 wt %, 20 wt %, 15 wt %, 10 wt %, 9 wt %, 8 wt %, 7 wt %, 6 wt %, 5 wt %, 4 wt %, 3 wt %, and 2 wt % maleic anhydride. Also preferably the level of maleic anhydride (MA) in the polymer-g-MA may be greater than about 0.1 wt %, preferably greater than about 0.5 wt %, alternately greater than about 1 wt % maleic anhydride. In a preferred embodiment, the functionalized polymer may comprise about 0.1 to about 10 wt % maleic anhydride; preferably about 0.25 to about 5 wt %; more preferably about 0.5 to about 4 wt %; still more preferably about 0.75 to about 3.5 wt %; such as about 1.5 to about 2.5 wt % of maleic anhydride. Various techniques may be used to characterize the functionalized polymers, some of which are described in "Structure Characterization, The Science and Technology of Elastomers," F. Eirich, editor, Academic Press 1978, Chapter 3 by G. Ver Strate, which is incorporated by reference. The functional group content of the grafted polymer may be determined by Fourier Transform Infrared (FTIR) spectroscopy based on a calibration with standards whose absolute functional group content has been determined.

By having another rubber, the overall rubber content, counting both BIMS rubber and at least one secondary rubber, can be increased in the thermoplastic elastomer composition while maintaining a desirable morphology including small particle size dispersion of the rubber components in the polyamide matrix. The increase in maximum rubber content can be realized particularly in view of the restricted coalescence of the BIMS particles when in the presence of an immiscible secondary rubber. Furthermore, by controlling the amount of the secondary rubber concentration at a low or minor level as described above, it is possible to, avoid the need to cure or vulcanize the secondary rubber in order to substantially avoid or prevent its coalescence. This is particularly true since the secondary rubber is reactive in the presence of and with the polyamide and becomes substantially immobilized. Without the need to add curatives to the secondary rubber it is then unnecessary to pre-mix or to pre-compound it with curatives (although curatives can optionally be added and the secondary rubber dynamically vulcanized using the same technology as for BIMS), and direct addition of the secondary rubber to the extruder mixer is feasible during extrusion mixing; the secondary rubber preferably is provided in pellet form. Furthermore, since most functionalized rubbers, such as maleated ethylene copolymer rubbers and maleic anhydride grafted rubbers, are fairly permeable, it is desirable to keep the secondary rubber concentration low, typically less than about 20 wt %; preferably about 1 wt % to about 20 wt %; more preferably about 1 wt % to about 10 wt % or less, based on the total weight of the overall composition. The amount of the secondary, functionalized compatibilizer rubber blended is typically less than about 20 wt %; preferably less than about 10 wt %; generally about 0.5 wt % to about 20 wt %; for example about 5 wt % to about 15 wt %; such as about 7.5 wt % to about 12.5 wt %.

With reference to the polymers and/or elastomers referred to herein, the terms "cured," "vulcanized," or "crosslinked" refer to the chemical reaction comprising forming bonds as, for example, during chain extension, or crosslinks between polymer chains comprising the polymer or elastomer to the extent that the elastomer undergoing such a process can provide the necessary functional properties resulting from the curing reaction when the tire is put to use. For purposes of the present invention, absolute completion of such, curing reactions is not required for the elastomer-containing composition to be considered "cured," "vulcanized" or "crosslinked." For example, for purposes of the present invention, a tire comprising an innerliner layer composition based on the present invention is sufficiently cured when the tire of which it is a component passes the necessary product specification tests during and after manufacturing and performs satisfactorily when used on a vehicle. Furthermore, the composition is satisfactorily, sufficiently or substantially cured, vulcanized or crosslinked when the tire can be put to use even if additional curing time could produce additional crosslinks.

Generally, polymer compositions, e.g., those used to produce tires, are crosslinked in the finished tire product.

Crosslinking or vulcanization is accomplished by incorporation of curing agents and/or accelerators; the overall mixture of such agents being typically referred to as a cure "system." It is known that the physical properties, performance characteristics, and durability of vulcanized rubber compounds are directly related to the number (crosslink density) and types of crosslinks formed during the vulcanization reaction. (See, e.g., Helt et al., *The Post Vulcanization Stabilization for NR*, Rubber World 18-23 (1991). Curing agents include those components described above that facilitate or influence the cure of elastomers, and generally include metals, metal oxides, accelerators, sulfur, peroxides, and other agents common in the art, and as described above. Crosslinking or curing agents include at least one of, e.g., sulfur, zinc oxide, and fatty acids and mixtures thereof. Peroxide-containing cure systems may also be used. Generally, polymer compositions may be crosslinked by adding curative agents, for example sulfur, metal oxides (i.e., zinc oxide, ZnO), organometallic compounds, radical initiators, etc. and heating the composition or mixture.

When the method known as "dynamic vulcanization" is used, the process of dispersing the cure system is modified as described in detail hereinafter. Generally, the term "dynamic vulcanization" is used to denote a vulcanization process in which a thermoplastic or engineering resin and at least one vulcanizable rubber are mixed under conditions of high shear and elevated temperature in the presence of a curing agent or curing system for the rubber(s). As a result, the rubber is simultaneously crosslinked and dispersed as particles, preferably in the form of a microgel, within the resin which forms a continuous matrix. The resulting composition is known in the art as a "dynamically vulcanized alloy" or DVA. Typically, dynamic vulcanization is effected by mixing the ingredients at a temperature which is at or above the during temperature of the rubber, and at or above the melting temperature of the resin, using equipment such as roll mills, Banbury® mixers, continuous mixers, kneaders, or mixing extruders (such as twin screw extruders). The unique characteristic of the dynamically vulcanized or cured composition is that, notwithstanding the fact that the rubber is cured the composition can be processed and reprocessed by conventional thermoplastic processing techniques such as extrusion, injection molding, compression molding, etc. Scrap and/or flashing can also be salvaged and reprocessed. In a typical dynamic vulcanization process, curative addition is altered so as to substantially simultaneously mix and vulcanize, or crosslink, at least one of the vulcanizable components in a composition comprising at least one vulcanizable rubber, elastomer or polymer and at least one polymer or resin not vulcanizable using the vulcanizing agent(s) for the at least one vulcanizable component. (See, e.g., U.S. Pat. No. 6,079,465 and the references cited therein.) However, in the present invention, the dynamic vulcanization process is further modified, as described below, in order to achieve the particular advantages resulting from such modification.

The following are common curatives that can function in the present invention: ZnO, CaO, MgO, $Al_2O_3$, $CrO_3$, FeO, $Fe_2O_3$, and NiO. These metal oxides can be used in conjunction with the corresponding metal stearate complex (e.g., the stearate salts of Zn, Ca, Mg, and Al), or with stearic acid, and either a sulfur compound or an alkylperoxide compound. (See also, *Formulation Design and Curing Characteristics of NBR Mixes for Seals*, Rubber World 25-30 (1993). To the curative agent(s) there are often added accelerators for the vulcanization of elastomer compositions. The curing agent(s), with or without the use of at least one accelerator, is often referred to in the art as a curing "system" for the elastomer(s). A cure system is used because typically more than one curing agent is employed for beneficial effects, particularly where a mixture of high diene rubber and a less reactive elastomer is used. Furthermore, the properties of the cure system can be adapted to the mixing process so that the conditions of the invention can be met. For example, to determine the cure response of the particular rubber(s) present in a composition, the rubber(s) and cure system can be combined by means known to those skilled in the art, e.g., on a two-roll mill, Banbury mixer or mixing extruder. A sample of the mixture, often referred to as the "accelerated" compound, can be cured under static conditions, such as in the form of a thin sheet using a mold that is subjected to heat and pressure in a press. Samples of the accelerated, thin sheets, cured for progressively longer times and/or at higher temperatures, are then tested for stress strain properties and/or crosslink density to determine the state of cure (described in detail in American Society for Testing and Materials, Standard ASTM D412). Alternatively, the accelerated compound can be tested for state of cure using an oscillating disc cure rheometer test (described in detail in American Society for Testing and Materials, Standard ASTM D2084). Thereafter the overall time and temperature of the dynamic vulcanization process can be adjusted so that the vulcanizable rubbers present in the composition are sufficiently cured to achieve the desired properties of the thermoplastic composition of which they are a part, e.g., an air or fluid retention barrier such as an innerliner for a tire. For purposes of the present invention, such state of cure can be referred to as "substantially fully cured."

It will be appreciated that the vulcanizable rubber, typically the first rubber, for example the halogenated isobutylene elastomer such as BIMS (or a mixture of such rubbers), will be cured to at least 50% of the maximum state of cure of which it is capable based on the cure system, time and temperature, and typically, the state of cure of such rubber will exceed 50% of maximum cure. Since the second rubber can also comprise a vulcanizable rubber, where such second rubber is vulcanized, for example according to dynamic vulcanization technology as described herein, it too typically will be cured to at least 50% of the maximum state of cure of which it is capable based on its curative or cure system and the time and temperature at which it is processed. Alternatively, as discussed herein, such second rubber can also be grafted, linked and/or associated with the polyamide resin, with or without the use of curatives, so that its state of cure is not a limitation, provided that it is sufficiently dispersed in a small enough particle size so as to provide the properties desired for the use to which the composition will be put. Conversely, it may be desirable to cure the rubber particles to less than the maximum state of cure of which the rubber is capable so that the flexibility, as measured, for example, by Young's modulus, of the rubber component(s) is at a suitable level for the end-use to which the composition is to be put, e.g., a tire innerliner or hose component. Consequently, it may be desirable to control the state of cure of the rubber(s) used in the composition to be less than or equal to about 95% of the maximum degree of cure of which they are capable, as described above.

For purposes of dynamic vulcanization in the presence of an engineering resin to form, for example, a highly impermeable layer or film, any conventional curative system which is capable of vulcanizing saturated or unsaturated halogenated polymers may be used to vulcanize at least the elastomeric halogenated copolymer of a $C_4$ to $C_7$ isomonoolefin and a para-alkylstyrene, except that peroxide curatives are specifically excluded from the practice of this invention when there is present one or more thermoplastic engineering resin such that peroxide would cause such resins themselves to crosslink. In that circumstance, if the engineering resin would itself vulcanize or crosslink, it would result in an excessively cured, non-thermoplastic composition. Suitable curative systems for the elastomeric halogenated copolymer component of the present invention include zinc oxide in combination with zinc stearate or stearic acid and, optionally, one or more of the following accelerators or vulcanizing agents: Permalux, the di-ortho-tolylguanidine salt of dicatechol borate; HVA-2, m-phenylene bis maleimide; Zisnet, 2,4,6-trimercapto-5-triazine; ZDEDC, zinc diethyl dithiocarbamate and also including for the purposes of the present invention, other dithiocarbamates; Tetrone A, dipentamethylene thiuram hexasulfide; Vultac 5, alkylated phenol disulfide, SP1045, phenol formaldehyde resin; SP1056, brominated alkyl phenol formaldehyde resin; DPPD, diphenyl phenylene diamine; salicylic acid, ortho-hydroxy benzoic acid; wood rosin, abietic acid; and TMTDS, tetramethyl thiuram disulfide, used in combination with sulfur.

Curative accelerators include amines, guanidines, thioureas, thiazoles, thiurams, sulfenamides, sulfenimides, thiocarbamates, xanthates, and the like. Acceleration of the cure process may be accomplished by adding to the composition an amount of the accelerant. The mechanism for accelerated vulcanization of rubber involves complex interactions between the curative, accelerator, activators and polymers. Ideally, all of the available curative is consumed in the formation of effective crosslinks which join individual polymer chains to one another and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiary-butyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea. Curatives, accelerators and the cure systems of which they are a part that are useful with one or more crosslinkable polymers are well-known in the art.

The cure system can be dispersed in a suitable concentration into the rubber component, the rubber component optionally containing one or more filler, extender and/or plasticizer by, e.g., mixing the rubber and the cure system components in a process step prior to addition of the rubber-containing composition to the thermoplastic using any mixing equipment commonly used in the rubber industry for such purpose, e.g., a two-roll rubber mill, a Banbury mixer, a mixing extruder and the like. Such mixing is commonly referred to as "accelerating" the rubber composition. Alternatively, the rubber composition can be accelerated in a stage of a mixing extruder prior to carrying out dynamic vulcanization, although this is difficult to control in a commercial, practical, integrated process and is less desirable. It is particularly preferred that the cure system be dispersed in the rubber phase, or in a rubber composition also optionally including one or more fillers, extenders and other common ingredients for the intended end-use application, prior to the addition of the rubber to the thermoplastic resin(s) in the mixing equipment in which it is intended to carry out dynamic vulcanization. By so doing, the precompounded rubber composition can be pelletized for more efficient and effective feeding to the dynamic vulcanization equipment, preferably a mixing extruder, as described below.

In one embodiment of the invention, at least one curing agent is typically present at about 0.1 to about 15 phr; alternatively at about 0.5 to about 10 phr.

Useful combinations of curatives, cure modifiers and accelerators can be illustrated as follows: As a general rubber vulcanization agent, e.g., a sulfur vulcanization agent, powdered sulfur, precipitated sulfur, high dispersion sulfur, surface-treated sulfur, insoluble sulfur, dimorpholinedisulfide, alkylphenoldisulfide, and mixtures thereof. Such compounds may be used in an amount of about 0.5 phr to about 4 phr (parts by weight per 100 parts by weight of the elastomer component). Alternatively, where the use of such a material is feasible in view of other polymer and resin components present an organic peroxide vulcanization agent, benzoylperoxide, t-butylhydroperoxide, 2,4-dichlorobenzoylperoxide, 2,5-dimethyl-2,5-di(t-butylperoxy)hexane, 2,5-dimethylhexane-2,5-di(peroxylbenzoate), and mixtures thereof. When used, such curatives can be present at a level of about 1 phr to about 20 phr. Other useful curatives include phenol resin vulcanization agents such as a bromide of an alkylphenol resin or a mixed crosslinking agent system containing stannous chloride, chloroprene, or another halogen donor and an alkylphenol resin and mixtures thereof. Such agents can be used at a level of about 1 phr to about 20 phr. Alternatively, other useful curing agents, cure modifiers and useful levels include zinc oxide and/or zinc stearate (about 0.05 phr to about 5 phr), stearic acid (about 0.1 phr to about 5 phr), magnesium oxide (about 0.5 phr to about 4 phr), lyserge (10 to 20 phr or so), p-quinonedioxime, p-dibenzoylquinonedioxime, tetrachloro-p-benzoquinone, poly-p-dinitrosobenzene (about 0.5 phr to about 10 phr), methylenedianiline (about 0.05 phr to about 10 phr), and mixtures thereof. Further, if desired or necessary, one or more of a vulcanization accelerator may be added in combination with the vulcanization agent, including for example, an aldehyde-ammonia, guanidine, thiazole, sulfenamide, thiuram, dithio acid salt, thiurea, and mixtures thereof, for example, in an amounts of about 0.1 phr to about 5 phr or more.

The preferred polymer components comprise halogenated isobutylene-containing copolymers as the vulcanizable component(s), e.g., halogenated butyl such as chlorinated butyl or brominated butyl, and brominated isobutylene-p-methylstyrene copolymer (BIMS copolymer), and a thermoplastic polymer such as nylon or a blend of various nylon polymers. It is particularly preferred that the dynamically vulcanized compositions of the present invention comprise the halogenated rubber component(s) in the form of dispersed, substantially fully cured, small particles in a continuous matrix of thermoplastic. The dynamically vulcanized halogenated rubber component is preferably dispersed in the polyamide matrix in the form of small particles having an average particle size of about 0.1 micron to about 1 micron; for example about 0.1 micron to about 0.75 micron; or about 0.1 micron to about 0.5 micron. Particle size can be determined by methods well known in the art and including tapping phase atomic force microscopy (AFM), as described in published patent application US 2006/0223941 (Oct. 5, 2006), incorporated herein by reference.

For purposes of the present invention, the BIMS component is also referred to as a low-grafting efficiency elastomer and the secondary rubbers are referred to as high-grafting efficiency rubbers. In each instance, grafting refers to grafting onto the polyamide(s) that are present in the composition. This distinction in efficiency and the method for measuring the performance of the polymers are described further below.

The compositions described herein may have one or more filler components such as calcium carbonate, clay, mica, silica and silicates, talc, titanium dioxide, starch and other organic fillers such as wood flour, and carbon black. Suitable filler materials include carbon black such as channel black, furnace black, thermal black, acetylene black, lamp black, modified carbon black such as silica treated or silica coated carbon black (described, for example, in U.S. Pat. No. 5,916,934, incorporated herein by reference), and the like. Reinforcing grade carbon black is preferred. The filler may also include other reinforcing or non-reinforcing materials such as silica, clay, calcium carbonate, talc, titanium dioxide and the like. The filler may be present at a level of from 0 to about 30 percent by weight of the rubber present in the composition.

Exfoliated, intercalated, or dispersed clays may also be present in the composition. These clays, also referred to as "nanoclays", are well known, and their identity, methods of preparation and blending with polymers is disclosed in, for example, JP 2000109635, JP 2000109605, JP 11310643; DE 19726278; WO98/53000; and U.S. Pat. Nos. 5,091,462, 4,431,755, 4,472,538, and 5,910,523. Swellable layered clay materials suitable for the purposes of the present invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness typically about 4 to about 20 Å in one embodiment, and about 8 to about 12 Å in another embodiment, bound together and containing exchangeable cations such as $Na^+$, $Ca^{+2}$, $K^+$ or $Mg^{+2}$ present at the interlayer surfaces.

Layered clay may be intercalated and exfoliated by treatment with organic molecules (swelling agents) capable of undergoing ion exchange reactions with the cations present at the interlayer surfaces of the layered silicate. Suitable swelling agents include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R_1R_2R_3N$, wherein $R_1$, $R_2$, and $R_3$ are $C_1$ to $C_{30}$ alkyls or alkenes which may be the same or different. In one embodiment, the exfoliating agent is a so-called long chain tertiary amine, wherein at least $R_1$ is a $C_{12}$ to $C_{20}$ alkyl or alkene.

Another class of swelling agents include those which can be covalently bonded to the interlayer surfaces. These include polysilanes of the structure —$Si(R')_2R^2$ where R' is the same or different at each occurrence and is selected from alkyl, alkoxy or oxysilane and $R^2$ is an organic radical compatible with the matrix polymer of the composite. Other suitable swelling agents include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 and WO92/02582.

In a preferred embodiment of the invention, the exfoliating or swelling agent is combined with a halogenated polymer. In one embodiment, the agent includes all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, dihydrogenated tallowalkyl-methylamine and the like, and amine-terminated polytetrahydrofuran; long-chain thiol and thiosulfate compounds such as hexamethylene sodium thiosulfate. In another embodiment of the invention, improved interpolymer impermeability is achieved by the use of polyfunctional curatives such as hexamethylene bis(sodium thiosulfate) and hexamethylene bis(cinnamaldehyde).

The amount of exfoliated, intercalated, or dispersed clay incorporated in the composition in accordance with this invention is an amount sufficient to develop an improvement in the mechanical properties or barrier properties of the composition, e.g. tensile strength or air/oxygen permeability. Amounts typically can be from about 0.5 to about 15 wt % in one embodiment, or about 1 to about 10 wt % in another embodiment, and about 1 to about 5 wt % in yet another embodiment, based on the polymer content of the composition. Expressed in parts per hundred rubber, the exfoliated, intercalated, or dispersed clay may be present at about 1 to about 30 phr in one embodiment, and about 3 to about 20 phr in another embodiment. In one embodiment, the exfoliating clay is an alkylamine-exfoliating clay.

As used herein, the term "process oil" means both the petroleum derived process oils and synthetic plasticizers. A process or plasticizer oil may be present in air barrier compositions. Such oils are primarily used to improve the processing of the composition during preparation of the layer, e.g., mixing, calendering, etc. Suitable plasticizer oils, particularly for the elastomer component(s), include aliphatic acid esters or hydrocarbon plasticizer oils such as paraffinic or naphthenic petroleum oils. The preferred plasticizer oil for use in standard, non-DVA, non-engineering resin-containing innerliner compositions is a paraffinic petroleum oil; suitable hydrocarbon plasticizer oils for use in such innerliners include oils having the following general characteristics.

| Property | Preferred | Minimum | Maximum |
|---|---|---|---|
| API gravity at 60° F. (15.5° C.) | 15-30 | 10 | 35 |
| Flash Point, (open cup method) ° F. (° C.) | 330-450 (165-232° C.) | 300 (148° C.) | 700 (371° C.) |
| Pour Point, ° F. (° C.) | 30 to +30 (−34 to −1° C.) | −35 (−37° C.) | 60 (15° C.) |
| SSU @ 100° F. (38° C.) | 100-7,000 | 50 | 20,000 |

Generally, the process oil may be selected from paraffinic oils, aromatic oils, naphthenic oils, and polybutene oils. Polybutene process oil is a low molecular weight (less than 15,000 Mn) homopolymer or copolymer of olefin-derived units having from about 3 to about 8 carbon atoms, more preferably about 4 to about 6 carbon atoms. In another embodiment, the polybutene oil is a homopolymer or copolymer of a $C_4$ raffinate. Low molecular weight "polybutene" polymers is described in, for example, Synthetic Lubricants and High-Performance Functional Fluids 357-392 (Leslie R. Rudnick & Ronald L. Shubkin, ed., Marcel Dekker 1999) (hereinafter "polybutene processing oil" or "polybutene"). Useful examples of polybutene oils are the PARAPOL™ series of processing oils (ExxonMobil Chemical Company, Houston Tex.), including grades identified as PARAPOL™ 450, 700, 950, 1300, 2400, and 2500. The PARAPOL™ series of polybutene processing oils are typically synthetic liquid polybutenes having a certain molecular weight. The molecular weights of the PARAPOL™ oils are from about 420 Mn (PARAPOL™ 450) to about 2700 Mn (PARAPOL™ 2500). The molecular weight distribution (MWD) of the PARAPOL™ oils are typically about from 1.8 to about 3, preferably about 2 to about 2.8. The density (g/ml) of PARAPOL™ processing oils varies from about 0.85 (PARAPOL™ 450) to about 0.91 (PARAPOL™ 2500). The bromine number (CG/G) for PARAPOL™ oils ranges from about 40 for the 450 Mn process oil, to about 8 for the 2700 Mn process oil.

Rubber process oils also have ASTM designations depending on whether they fall into the class of paraffinic, naphthenic or aromatic hydrocarbonaceous process oils. The type of process oil utilized will be that customarily used in conjunction with a type of elastomer component and a skilled rubber chemist will recognize which type of oil should be utilized with a particular rubber in a particular application. For a thermoplastic elastomer composition the oil may be present at a level of 0 to about 20 wt % of the total composition; preferably oil is not included in order to maximize impermeability of the composition.

Minimizing the viscosity differential between the rubber or RIMS component and thermoplastic or nylon components during mixing and/or processing enhances uniform mixing and fine blend morphology, in other words small, dispersed particles of vulcanized rubber, that significantly enhance good blend mechanical as well as desired permeability properties. However, as a consequence of the flow activation and shear thinning characteristic typical of BIMS polymers, reduced viscosity values of BINS polymers at the elevated temperatures and shear rates encountered during mixing are much more pronounced than the reductions in viscosity of the thermoplastic component with which the BIMS polymer is blended. Thus, in view of the lower viscosity of BIMS at high shear rates and temperatures, if viscosity of the nylon component is to be selected in order to be similar to that of the rubber, it is necessary to use either low molecular weight grade Nylons having lower viscosity or Nylons in combination with plasticizer, or a combination of both approaches, for further viscosity reduction. Having the Nylon resin phase viscosity match or approach that of the BIMS polymer phase can improve the dispersed particle size and overall morphology of dynamically vulcanized BIMS and Nylon blends, such as disclosed in EP857761A1 and EP969039A1. However, depending on the nature of the modifications these alternatives may result in undesirable mechanical properties, for example, as a consequence of the use of lower molecular weight nylons, and/or higher permeability as a consequence of the use of a typical nylon plasticizer, depending on the amount and type of plasticizer used.

An alternative approach to lowering the viscosity of the Nylon phase, described in WO 2007050076, published May 3, 2007, incorporated herein by reference, is based on the use of low molecular weight polyamide polymers as plasticizers. In this way, it is possible to use medium and high molecular weight Nylons and thus maintain mechanical properties of the resulting vulcanized BIMS and Nylon dynamically vulcanized blends and furthermore, since low molecular weight polyamides exhibit relatively low permeability, the resulting dynamically vulcanized blends do not have their permeability properties significantly reduced. Suitable plasticizers include those sold under various trademarks including "Sunmide" (Sanwa Chemical Industry Co., Ltd.) and Uni-Rez® (Arizona Chemical). Such materials typically have a molecular weight of less than about 20,000 Daltons; such as about 1,000 to about 18,000 Daltons; preferably about 3,000 to about 17,000 Daltons and have flash points greater than about 250° C., brittleness temperatures of less than about −20° C., and softening temperature of less than bout 180° C. Furthermore, useful low molecular weight amides exhibit a viscosity at 200° C. of less than about 15 Pascal-seconds (Pa-s); alternatively about 0.05 to about 12 Pa-s; preferably about 0.2 to about 10 Pa-s. Suitable products are commercially available covering the full range of viscosities above, including: Sunmide product codes 15, 15K-5, 52 and 72; 300; 500; 550; HT-110, 130K, 180D, 140E, 140PK-20 and 100G exhibiting viscosities ranging from about 0.25 Pa-s to about 0.60 Pa-s measured at 190° C.; and about 0.4 Pa-s to about 15 Pa-s measured at 200° C.; as well as Uni-Rez grades 2611-2722 and specifically including grades 2614 having a viscosity of about 1.1, grade 2633 having a viscosity of about 4.3 and grade 2653 having a viscosity of about 7.5, all measured at 200° C.

In addition, plasticizers such as organic esters and other synthetic plasticizers can be used. A particularly preferred plasticizer for use in a DVA composition is N-butylsulfonamide or other plasticizers suitable for polyamides. Nylon plasticizers include, but are not limited to, lactams such as caprolactam and lauryl lactam; and sulfonamides, such as o,p-toluene sulfonamide, n-ethyl o,p-toluene sulfonamide, trimellitates, phthalates, adipates, phosphates, and glycolates. Other plasticizers include those disclosed in U.S. Pat. No. 4,197,379, incorporated herein by reference. Exemplary plasticizers can be selected from the group consisting of phthalate plasticizers, adipate plasticizers, phosphate plasticizers, glycolate plasticizers, sulfonamide plasticizers, trimellitate plasticizers and polymeric plasticizers, particularly low molecular weight nylons. Preferred plasticizers are selected from the group consisting of phthalate plasticizers, adipate plasticizers, and sulfonamide plasticizers. Examples of suitable plasticizers include dibutyl phthalate, dicyclohexyl phthalate, diethyl phthalate, diisodecyl phthalate, dimethyl phthalate, di(2-ethylhexyl)phthalate, diphenyl phthalate, diundecyl phthalate, mixed $C_7$-$C_{11}$ dialkyl phthalate, butyl benzyl phthalate, benzyl, phthalate, di(2-ethylhexyl) adipate, mixed $C_7$-$C_9$ dialkyl adipate, tributoxyethyl phosphate, tributyl phosphate, tricresyl phosphate, triphenyl phosphate, cresyl diphenyl phosphate, 2-ethylhexyl diphenyl phosphate, isodecyl diphenyl phosphate, butyl phthalyl butyl glycolate, methyl phthalyl ethyl glycolate and mixed $C_7$-$C_9$ alkyl trimellitate. Sulfonamide plasticizers comprise a preferred class of plasticizers for polyamides, including for example, N-butyl benzylsulfonamide, N-cyclohexyl-p-toluenesulfonamide, o,p-toluenesulfonamide, N-ethyl-o,p-toluenesulfonamide and N-ethyl-o-toluenesulfonamide. In another embodiment, rubber process oils such as naphthenic, aromatic or paraffinic extender oils may be present at about 1 to about 5 phr. In still another embodiment, naphthenic, aliphatic, paraffinic and other aromatic oils are substantially absent from the composition. By "substantially absent", it is meant that naphthenic, aliphatic, paraffinic and other aromatic oils may be present, if at all, to an extent no greater than 2 phr in the composition.

The degree of cure of the vulcanized rubber can be described in terms of gel content, cross-link density, the amount of extractable components or it can be based on the state of cure that would be achieved in the rubber were it to be cured in the absence of the resin. For example, in the present invention, it is preferred that the halogenated elastomer achieve about 50 to about 85% of full cure based on the elastomer per se as measured, e.g., by tensile strength or using the oscillating disc cure meter test (ASTM D 2084, Standard Test Method for Rubber Property-Vulcanization Using Oscillating Disk Cure Meter).

Having described each of the components useful in the thermoplastic elastomeric composition of the present invention, the following paragraphs describe the efficient and novel methods for producing such compositions.

Dynamic vulcanization can be carried out in various types of commercial equipment generally available in the rubber and plastics industry including Banbury® internal mixers, roll mixers, and mixing extruders. A preferred mixing device is a twin-screw extruder with intermeshing screws. Mixing is generally conducted under such time and temperature conditions that the dispersed rubber particles, particularly the first rubber component, halogenated isobutylene-containing elastomer, are dispersed and cured and/or interact with the polyamide to the extent necessary to maintain their stability, i.e., to avoid coalescence of such particles at the completion of mixing the composition. A suitable range of dynamic vulcanization temperatures is typically from about the melting temperature of the resin(s) to less than about 300° C.; for example, the temperature may range from about the melting temperature of the matrix resin(s) to about 275° C.; preferably about 230° C. to about 265° C.; alternatively, about 235° C. to about 260° C.; such as about 240° C. to about 260° C.; for example, about 230° C. to about 250° C. Alternatively, dynamic vulcanization can be carried out at a temperature range from about 10° C. to about 50° C. above the melting temperature of the matrix resin; more preferably about 20° C. to about 40° C. above the melting temperature of the polyamide or mixed polyamide thermoplastic matrix. A mixing extruder typically is comprised of multiple barrel sections, each of which can be temperature controlled and the function of each can be varied, for example, as a feed section, mixing section, cooling section, melt section, etc. Consequently, the temperature in each section can be controlled to effect the most appropriate conditions for melting, mixing, dispersing and curing of the components that are fed upstream or within each section. For example, temperatures in upstream-most sections can be elevated in order to promote heating, melting and dispersion of the polyamide(s), and polyamide stabilizers and plasticizers which are typically fed in the first section(s) of the extruder, for example about 230° C. to about 250° C. This can be followed by temperatures appropriate for mixing, dispersion and dynamic vulcanization of the BIMS-containing component, for example about 200° C. to about 230° C., and thereafter temperatures appropriate for mixing and dispersion of the second elastomer and for delivery of the mixed composition from the mixing extruder, for example about 190° C. to about 220° C. These temperatures are for purposes of exemplification only since specific values can be selected based on the particular polyamide type(s) and grade(s), the particular cure system used to dynamically Vulcanize the BIMS, or other halogenated isobutylene-containing, component as well as the specific type of second rubber, its activity and whether it is dynamically vulcanized or dispersed without dynamic vulcanization.

In one embodiment of the present invention, the necessary or suitable amount of crosslinking agent(s) or cure system is dispersed in the elastomer component(s) by mixing the crosslinking agent capable of crosslinking the elastomer component(s) which are desired to form the vulcanized, dispersed phase, into the elastomer component at a low to moderate temperature, insufficient to substantially activate the cure system, prior to contacting the thus compounded or accelerated elastomer component(s) with the resin component(s) for the purpose of carrying out dynamic vulcanization of the mixture. By this method the crosslinking agent does not substantially react with the rubber, nor does it have an opportunity to partially react with the thermoplastic resin to cause either molecular weight degradation or crosslinking of the resin. Furthermore, control of the crosslinking rate and extent of crosslinking of the elastomer component is more readily achieved. Consequently, the compositions of the present invention exhibit improved properties.

For example, a mixing device such as a Banbury® mixer, two-roll rubber mill, etc., is used to pre-mix or pre-compound the elastomer component with a predetermined amount of crosslinking agent or "system," the latter referring to a multi-component mixture of curatives, particularly if a combination of crosslinking agent and accelerator is used, until a substantially uniform dispersion is obtained. At this time, the elastomer component may have added thereto, if desired, suitable amounts of optional fillers such as carbon black or modified carbon black, clay or modified clay oil and/or plasticizer. As noted above, during this phase of mixing the temperature is controlled at a low enough level for the particular elastomer(s) selected and in consideration of the activity of the cure system, to effectively disperse the rubber phase components and to avoid premature crosslinking of the elastomers. A useful temperature during the mixing step for dispersing the curatives or cure system can be less than about 120° C.

Having several components present in the thermoplastic elastomer composition, including one or more polyamides, vulcanizable BIMS elastomer, and at least one secondary rubber, it would ordinarily be necessary to include multiple mixing steps or stages in the overall process in order to provide sufficient distributed and dispersive mixing as well as dynamic vulcanization. Typically the BIMS rubber is pre-compounded with curatives using an internal mixer such as a Banbury® or a rubber mill and it is pelletized. In the prior art process each individual polyamide component is pre-mixed with plasticizer and stabilizers using a twin-screw extruder and pelletized. Finally, the pre-compounded BIMS rubber pellets, pre-blended polyamide pellets, and the secondary rubber pellets are metered or fed into a twin-screw extruder for extrusion mixing and dynamic vulcanization. Such multi-step mixing and intermediate cooling and pelletizing steps are costly, subject to production errors and lead to significant inventory in intermediate stages during production.

In contrast, the dynamic vulcanization process of the present invention is modified from that of the typical prior art process. In the improved processes of the present invention there is provided a reduction in the number of mixing steps required to produce a thermoplastic elastomer composition having excellent morphology for applications such as tire innerliners and other industrial applications using barrier films. In particular, mixing preferably utilizes twin-screw extrusion mixing processes, particularly a one-step twin screw mixing process, to produce a thermoplastic elastomer composition based on blends of polyamides with reactive compatibilized elastomers, including BIMS elastomer and secondary elastomers, as described above. A particularly preferred one-step, twin-screw extrusion mixing, dynamic vulcanization process involves sequential component addition, with one or more polyamides being added first in combination with their appropriate stabilizer(s) and plasticizer(s), if any, followed by one or more low-grafting-efficiency elastomer (such as BIMS containing its curing or crosslinking agent(s) and in pelletized form), and thereafter one or more high-grafting-efficiency elastomer (a secondary elastomer as described above) being added last. Mixing and processing efficiencies are achieved by spacing the addition of the compositional elements along the twin-screw extruder barrel length using multiple feed ports. In particular, the spacing between feed ports for the low-grafting efficiency and high-grafting-efficiency elastomers is selected to provide suitable opportunity for reaction with the polyamide(s) in order to obtain and stabilize a small particle size elastomer dispersed in a continuous polyamide matrix. In one embodiment such a result is accomplished by spacing the feed ports for the elastomers at L/D (ratio of the length of the extruder screw to the diameter of the extruder screw) greater than about 6 from one another along the length of the extruder barrel. The length, L, typically refers to the flighted length of the screw, in other words, the length of the screw portion that contains flights. The diameter of the screw refers to the maximum width of the screw in its flighted portion, in other words where screw flights are present, since extruder screws typically have sections of varying width depending on the function of a particular portion of the screw, e.g., transport, dispersion, mixing, melting, heating, cooling, etc. If flights are present on the screw in a portion which does not encounter the components of the compositions, e.g., thermoplastic resin and/or elastomer, such portion is not included in the determination of screw length or diameter. The calculation of L/D is the same for a twin-screw extruder and is based on one of the two screws since each typically has the same diameter and length.

In the processes of the present invention, mixing and dynamic vulcanization is preferably conducted in a twin-screw mixing extruder, commercial examples of which are readily available and well-known in the art. Shear rate at the time of mixing is typically greater than about 500 $sec^{-1}$; preferably about 500 to about 7500 $sec^{-1}$; alternatively, about 1000 to about 7500 $sec^{-1}$; for example about 2000 to about 7500 $sec^{-1}$. Such extruders need only be equipped to allow for multiple feed ports corresponding to the various components of the overall composition and the restrictions described in detail hereinafter. Furthermore, the mixing screws need only be adapted to provide for a mixing region following each of the feed ports and an appropriate length following introduction of all of the ingredients so that dynamic vulcanization can be carried out and completed to the extent desired using the polymeric components and SIMS vulcanizing agents or cure system selected. Such features are readily determined by one skilled in the art with limited experimentation based on the teachings herein. Alternatively, mixing and dynamic vulcanization can be conducted in any suitable mixing equipment in which the various components can be introduced and mixed and in which dynamic vulcanization can be conducted. For example, a Banbury® internal mixer can be used to receive each of the components or mixtures of components so that they can be mixed and dispersed and such a mixing device can be used to carry out dynamic vulcanization at elevated temperature. For convenience and efficient processing it is preferred to use an extruder, more preferably a twin-screw, co-rotating, intermeshing mixing extruder comprising suitable feed, mixing, cooling and delivery zones consistent with the teachings herein.

In a preferred mixing sequence the polyamide component(s), their stabilizers and plasticizers can be introduced into upstream feed ports of the extruder; these components need not be pre-mixed or pre-blended. Sufficient length along the screw should be provided to allow for the mixing and dispersion of the stabilizer and plasticizer in the polyamide phase. Mixing variations are available, such as adding stabilizer(s) with the nylon or dispersing stabilizer(s) with the nylon plasticizer (if the latter is used) and adding a mixture of stabilizers plus plasticizer to the nylon after its mixing has begun. If necessary, a cooling zone can be provided in order to avoid excessive heating of the polyamide such that its viscosity becomes undesirably low before it is mixed with the BIMS. In other words, as discussed above, for efficient mixing and dispersion of the BIMS in the polyamide, it is preferred that their viscosity of the polyamide and its stabilizer and plasticizer, and BIMS and its curatives and fillers and plasticizers, if any, be approximately the same (substantially "matched") at the time that they are mixed with one another and dynamic vulcanization be initiated. As described above, the BIMS rubber is typically pre-compounded with curatives, also referred to as "accelerated," using an internal mixer such as a Banbury® or a rubber mill and, for ease of feeding or metering, it typically is pelletized. As discussed above, temperature should be controlled in order to avoid too low a temperature and the resulting high viscosity of the polymers mixtures and the concomitant power requirement. Similarly, too high a temperature would result in excessively low viscosity, particularly of the polyamide mixture and possible degradation as well as poor mixing with the BIMS composition. A useful temperature range is about 230° C. to about 250° C.; preferably not lower than about 210° C. or higher than about 275° C.

Downstream of the BIMS feed port there is provided a feed port for the secondary rubber in pelletized form, the secondary rubber also referred to as the high grafting efficiency rubber. It is particularly preferred that the two rubber components not be fed to the mixing extruder together in order to avoid inadvertent coalescence of the rubber particles formed in the extruder. Furthermore, since the BIMS rubber exhibits a lower grafting efficiency it is fed first in order to provide additional time for grafting to the polyamide concurrently with the dynamic vulcanization dispersion and curing reaction. In contrast, the secondary rubber, exhibiting a higher grafting efficiency can be fed at a point further downstream and closer to the exit of the extruder since it reacts more quickly and more readily grafts to the polyamide.

Additionally, since grafting typically is accompanied by an increase in viscosity of the grafted polymers and can also be accompanied by viscous heating, if necessary suitable cooling zones can be introduced between the two rubber feed ports to control the temperature and viscosity of the composition, as well as a cooling zone following the second rubber feed port, if necessary, to control the viscosity and temperature of the overall composition at that point in order to achieve the desired morphology and particle size of the dispersed rubber components.

The specific characteristics of the extruder and screws (screw design or configuration, diameter, volume versus surface area, etc.) will determine the specific overall L/D of the system. However, for any given extruder, a general barrel position can be designated as an upstream or downstream position by taking the overall L/D and dividing it in half. Having done so, it is preferred that the lower grafting efficiency elastomer be added or fed in the first or upstream half of the extruder and the higher grafting efficiency elastomer be added or fed to the extruder in the second or downstream half of the extruder. As described, the polyamide components and their stabilizers and plasticizers, if any, are added first. Typically, a twin-screw, intermeshing, mixing extruder suitable for use in the present invention will have an L/D of at least about 25 to less than about 60; more preferably about 30 to about 55; alternatively about 35 to about 50; for example, about 38 to about 48.

Overall time of mixing for dynamic vulcanization can be about 30 seconds to about 8 minutes; for example about 45 seconds to about 6 minutes; such as about 1 minute to about 4 minutes. However, mixing time can, and preferably should be adjusted as needed to produce a dynamically vulcanized composition that exhibits suitably small and stable elastomer particle size(s) and an overall composition that exhibits the target physical and/or permeability properties based on the first and second rubbers used and also considering whether or not the second rubber is dynamically vulcanized, as discussed above. The selection of mixing time, overall or in each portion or stage of the process associated with addition of the various components as described above, is readily determined by a person skilled in the art of polymer mixing, particularly extrusion mixing, based on the principles and detailed information provided herein.

The thermoplastic elastomer composition thus obtained is structured with the elastomer component forming a discontinuous phase dispersed as a dispersion phase (domain) in a matrix of the nylon resin which forms a continuous phase. As a consequence of dynamic vulcanization, the composition remains thermoplastic and a film, layer or sheet-like structure of the composition can be formed using ordinary molding, extrusion or calendering.

By molding the thermoplastic elastomer composition obtained into a sheet, film, or tube using a T-sheeting die, straight or crosshead structure tubing die, inflation molding cylindrical die, etc. at the end of a single-screw extruder, or by calendering, it is possible to use the composition as the air permeation preventive layer, e.g., an innerliner, of a pneumatic tire and as a component or layer of a hose, etc. The thermoplastic elastomer compositions of the present invention may be taken up into strands once, pelletized, then molded by using a single-screw extruder that is typically used for resin.

The sheet or tubular molded article thus obtained can be effectively used for an innerliner layer of a pneumatic tire or the hose tube or hose cover of a low gas permeable hose. Furthermore, the low permeability characteristics of the composition are suitable for uses with fluids other than gasses, e.g., liquids such as water, hydraulic fluid, brake fluid, heat transfer fluid, etc., provided that the layer in direct contact with the fluid has suitable resistance to the fluid being handled.

Any range of numbers recited in the specification hereinabove or in the paragraphs and claims hereinafter, referring to various aspects of the invention, such as that representing a particular set of properties, units of measure, conditions, physical states or percentages, is intended to literally incorporate expressly herein by reference or otherwise, any number falling within such range, including any subset of numbers or ranges subsumed within any range so recited. Furthermore, the term "about" when used as a modifier for, or in conjunction with, a variable, characteristic or condition is intended to convey that the numbers, ranges, characteristics and conditions disclosed herein are flexible and that practice of the present invention by those skilled in the art using temperatures, times, concentrations, amounts, contents, carbon numbers, properties such as particle size, surface area, bulk density, etc., that are outside of the range or different from a single value, will achieve the desired result, namely, an dynamically vulcanized, high elastomer-content composition comprising at least one isobutylene-containing elastomer and at least one thermoplastic suitable for use, for example, in a pneumatic tire or hose, or as a tire innerliner.

EXAMPLES

The following commercially available products were used for the components employed in the Examples 1. Resin Components
   N11 (Nylon 11): Rilsan BMN O TL (Atochem)
   N6/66 (Nylon 6/66 copolymer): Ube 5033B (Ube)
   P: Plasticizer, BBSA, N-butylsulfonamide
   S: Stabilizer package, includes Irganox, Tinuvin, and CuI
2. Rubber Components
   BIMS-1: Exxpro 89-4 (ExxonMobil Chemical)
   ZnO: Zinc oxide curative
   St-acid: Stearic acid curative
   ZnSt: Zinc stearate curative
   AR201: Maleated Ethylene Ethyl Acrylate (EEA) copolymer (Mitsui-DuPont)
   Exxelor VA 1840: Maleated (0.2-0.5 wt %) Ethylene-Octene Copolymer (ExxonMobil Chemical)

In order to study the grafting efficiencies of elastomers to nylon, blends of elastomers with N6/66 were prepared using a Brabender internal mixer at 220° C. and 60 RPM for three minutes. 60 parts of nylon was added first for 2 minutes before the addition of 40 parts of the elastomer; the combination was then mixed for 1 minute. After mixing, the nylon-elastomer mixture was extracted with solvent(s) in order to determine the amount of elastomer grafted to the nylon. Solvents used were hot toluene and xylene for BIMS, hot xylene for AR201, and hot toluene and xylene for Exxelor 1840. Blends were extracted for 12 hours and the solvents were refreshed every four hours. After extraction, blends were dried in a vacuum oven at 60° C. for 24 hours. Based on the solvent extraction results, the weight percent of elastomer that was grafted onto the nylon after 1 minute at 220° C. in a Brabender mixer was determined for each elastomer; results are listed in Table 1. Of the three elastomers studied, Exxelor 1840 appears to graft onto N6/66 the most and is referred to as a "high grafting efficiency" elastomer. Grafting efficiency of AR201 to N6/66 is significantly lower and similar to that of BIMS; these elastomers would be characterized as "low grafting efficiency" elastomers.

TABLE 1

Grafting efficiencies of the elastomers evaluated

| Nylon | N6/66 Grafting (wt %)* |
|---|---|
| BIMS | 40 |
| AR201 | 43 |
| Exxelor 1840 | 86 |

*Weight percent unextracted rubber.

A dynamically vulcanized alloy (DVA) blend, designated F1, composition shown in Table 2, was prepared according to alternative methods using a JSW-44 (TEX44, Japan Steel Work) twin-screw extruder.

TABLE 2

F1 Formulation

| Formulation | F1 |
|---|---|
| Elastomers | |
| Exxpro 89-4 | 100 |
| ZnO | 0.15 |
| Stearic Acid | 0.60 |
| Zinc Stearate | 0.30 |
| AR201 | 10.1 |

TABLE 2-continued

F1 Formulation

| Formulation | F1 |
|---|---|
| Plastics | |
| Ube 5033B (N6/66) | 27.8 |
| Atochem BESN (N11) | 40.4 |
| Plasticizer | |
| BBSA | 11.0 |
| Stabilizer | |
| Irganox 1098 | 0.34 |
| Tinuvin 622 LD | 0.14 |
| CuI | 0.03 |

In the Comparative Example shown in Table 3, BINS rubber was pre-compounded with curatives using a kneader (an internal mixer) at 40 RPM for 3.5 minutes at 90° C. and pelletized. For the comparative example, each individual nylon component was pre-mixed with plasticizer and stabilizers using the JSW-44 twin-screw extruder at 210° C. at 100 RPM and pelletized. Therefore, in the Comparative Example, there are two additional twin-screw mixing steps (one for N6/66 and one for N11) in order to prepare the nylon masterbatches (nylon composition including plasticizer and stabilizers) before they are employed in a twin-screw extrusion mixing and dynamic vulcanization step. In this three-step Comparative Mixing Example, all pre-compounded rubber pellets, AR201 elastomer pellet, and pre-blended N6/66 and N11 pellets were metered and added into the first feed hopper of the first barrel section, in other words at the most upstream position.

As discussed above, typically an extruder is made up of linked barrel sections, each having a length equivalent to about 2 to about 3 L/D and each typically having an independent cooling section, optionally with independent thermocouple and pressure sensors. The JSW-44 twin-screw extruder used in this and the other twin-screw mixing examples reported herein had a total of 14 segments and an overall L/D of 49. Temperatures in barrel segments along the length of the extruder were set according to thermocouples and reflect temperatures of the metal. The temperatures ranged from about 190° C. to about 250° C. with a typical pattern as follows (thermocouple temperatures in ° C. from zone 1, feed, to zone 14, exit; actual temperature of the polymer composition at the extruder exit, section 14, was about 260° C. to about 270° C.): 250/250/250/250/230/200/200/200/200/200/200/195/190/220. The BINS component was typically introduced in zone 5 and the secondary rubber in zone 10; mixing zones were present at 4, 9, and 12.

As shown in Table 3, alternative one-step twin-screw mixing processes were used to prepare the DVA compositions designated F1. The liquid nylon plasticizer was fed via a pump at location number 2 on the extruder, corresponding to a position at L/D=7. Two additional feed locations were further downstream at number 3, L/D=24.5, and at number 4, L/D=35. The results obtained for Example 1 show that a good quality pellet with good rubber dispersion morphology (fine rubber dispersions in a continuous nylon matrix) can be, obtained by feeding nylons with stabilizers first, followed by the nylon plasticizer, and finally with the addition of the two elastomer components. However, if the low grafting efficiency elastomer (BIMS) is fed first before nylon, as shown in Example 2, poorly mixed pellets were obtained with co-continuous morphology. In order for the one-step mixing process to work, nylon(s) need to be fed prior to the rubber component(s); preferably nylon is fed with stabilizer and plasticizer although it is not necessary to feed stabilizers and plasticizer at the same feed point provided that these components are fed prior to the rubber(s).

TABLE 3

F1 DVA prepared by various twin-screw mixing methods

| | Comparative Example 1 | Example 1 | Example 2 |
|---|---|---|---|
| BIMS pre-compounded | Yes | Yes | Yes |
| Nylon pre-blended | Yes (N/P/S) | No | No |
| Three-step mixing | Yes | No | No |
| One-step mixing | No | Method 1 | Method 2 |
| Component(s) added* | Not applicable | N/S-P-R/A | R-P-A/N/S |
| Addition sequence 1-2-3** | | | |
| Pellet quality*** | Good | Good | Bad |
| Morphology**** | Good | Good | Co-continuous |

*N: nylons,
S: stabilizers,
P: plasticizer,
A: AR201,
R: rubber (BIMS)
**Extruder Location of Addition: 1-2-3 where 1 is at L/D = 3.5, 2 is at L/D = 7 and 3 is at L/D = 24.5 along the length of the extruder barrel.
***Pellet quality was judged by the surface smoothness of the extruded polymer strands.
****Morphology was evaluated using tapping phase AFM (Atomic Force Microscopy).

Additional formulations were prepared as shown in Table 4. Two nylons were used in the plastic phase in F1 and in F2, and only one nylon, N6/66, was used in formulations F3, F4, and F5. Therefore, comparative examples corresponding to compositions F3, F4, and F5 are two-step, twin-screw extrusion mixing methods since only one additional nylon pre-lending preparation step is required. As for one-step, twin-screw Mixing methods used for formulations F3, F4 and F5 as well as F1, four different feed locations were used: where location 1 was at L/D=3.5, location 2 at L/D=7; location 3 at L/D=24.5, and location 4 at L/D=35, again using a JSW-44 extruder having a total L/D of 49.

TABLE 4

DVA formulations of F2-F5

| Formulation | F2 | F3 | F4 | F5 |
|---|---|---|---|---|
| Elastomers | | | | |
| Exxpro 89-4 | 100 | 100 | 100 | 100 |
| ZnO | 0.15 | 0.15 | 0.15 | 0.15 |
| Stearic Acid | 0.60 | 0.60 | 0.60 | 0.60 |
| Zinc Stearate | 0.30 | 0.30 | 0.30 | 0.30 |
| AR201 | 9.2 | 0 | 0 | 10.1 |
| Exxelor 1840 | 0 | 10.0 | 10.0 | 0 |
| Plastics | | | | |
| Ube 5033B (N6/66) | 29.5 | 69.2 | 62.4 | 63.0 |
| Atochem BESN (N11) | 44.3 | 0 | 0 | 0 |
| Plasticizer | | | | |
| BBSA | 8.2 | 20.7 | 26.8 | 27.0 |
| Stabilizer | | | | |
| Irganox 1098 | 0.37 | 0.37 | 0.31 | 0.32 |
| Tinuvin 622 LD | 0.15 | 0.15 | 0.13 | 0.13 |
| CuI | 0.04 | 0.04 | 0.03 | 0.03 |

As shown in Tables 5 to 8, it is preferred to either add the two elastomers together or first add the elastomer with the lower grafting efficiency (BINS, as shown in Table 1). Poor morphology was obtained when BINS is added last (see Method 4). In Method 5, the BINS rubber was added along with the nylon stabilizers before the introduction of nylon plasticizer. Considering that it is desirable to lower the nylon viscosity by plasticization for viscosity matching to the elastomer components, addition of elastomer components before the plasticizer introduction is not desirable. Morphologies were excellent using Method 3 with either AR201 or Exxelor 1840 added last. In F1 and F2 formulations containing AR201, which had similar but slightly higher grafting efficiency comparing to that of BINS, good morphologies could be obtained when AR201 is added with BINS as in Method 1. However, with a much higher grafting efficiency observed for Exxelor 1840 in comparison with that of BINS, it is preferable to add a higher grafting efficiency polymer later, such as Exxelor 1840, which was added last in Method 3.

TABLE 5

F1 DVA prepared by various twin-screw mixing methods

| | Comparative Example 1 | Example 3 | Example 1 | Example 4 | Example 5 |
|---|---|---|---|---|---|
| Formulation | F1 | F1 | F1 | F1 | F1 |
| BIMS pre-compounded | Yes | Yes | Yes | Yes | Yes |
| Nylon pre-blended | Yes (N/P/S) | No | No | No | No |
| Three-step mixing | Yes | No | No | No | No |
| One-step mixing | No | Method 3 | Method 1 | Method 4 | Method 5 |
| Addition sequence 1-2-3-4 | Not applicable | N/S-P-R-A | N/S-P-R/A | N/S-P-A-R | N/S/R-P-A |
| Pellet quality | Good | Good | Good | NG (PI) | NG (PI) |
| Morphology | Good | Good | Good | NG | NG |
| Cast film quality | Good | Good | Good | NG | NG |

Locations of addition: 1-2-3-4 where 1 is at L/D = 3.5, 2 is at L/D = 7, 3 is at L/D = 24.5, and 4 is at L/D = 35
N: nylons,
S: stabilizers,
P: plasticizer,
A: AR201,
R: rubber of BIMSM
Poor morphology showed large nylon domains (grains), aggregation of elastomer dispersions, and/or occasional co-continuous nylon and rubber phases.
Cast film quality was judged by the uniformity and smoothness and the cast film.
NG = "Not Good";
PI = phase inversion, meaning that the rubber phase is either co-continuous with the nylon or it is the continuous phase.

TABLE 6

F2 DVA prepared by various twin-screw mixing methods

| | Comparative Example 2 | Example 6 | Example 7 | Example 8 | Example 9 |
|---|---|---|---|---|---|
| Formulation | F2 | F2 | F2 | F2 | F2 |
| BIMS pre-compounded | Yes | Yes | Yes | Yes | Yes |
| Nylon pre-blended | Yes (N/P/S) | No | No | No | No |
| Three-step mixing | Yes | No | No | No | No |
| One-step mixing | No | Method 3 | Method 1 | Method 4 | Method 5 |
| Addition Sequence 1-2-3-4 | Not applicable | N/S-P-R-A | N/S-P-R/A | N/S-P-A-R | N/S/R-P-A |
| Pellet quality | Good | Good | Good | NG (PI) | NG (PI) |
| Morphology | Good | Good | Good | NG | NG |
| Cast film quality | Good | Good | Good | NG | NG |

Locations of addition: 1-2-3-4 where 1 is at L/D = 3.5, 2 is at L/D = 7, 3 is at L/D = 24.5, and 4 is at L/D = 35
N: nylons,
S: stabilizers,
P: plasticizer,
A: AR201,
R: rubber of BIMS

TABLE 7

F3 DVA prepared by various twin-screw mixing methods

| | Comparative Example 3 | Example 10 | Example 11 | Example 12 | Example 13 |
|---|---|---|---|---|---|
| Formulation | F3 | F3 | F3 | F3 | F3 |
| BIMS pre-compounded | Yes | Yes | Yes | Yes | Yes |
| Nylon pre-blended | Yes (N/P/S) | No | No | No | No |
| Two-step mixing | Yes | No | No | No | No |
| One-step mixing | No | Method 3 | Method 1 | Method 4 | Method 5 |
| Adding sequence 1-2-3-4 | Not applicable | N/S-P-R-E | N/S-P-R/E | N/S-P-E-R | N/S/R-P-E |
| Pellet quality | Good | Good | Good | NG (PI) | NG (PI) |
| Morphology | Good | Good | Good | NG | NG |
| Cast film quality | Good | Good | Good | NG | NG |

Locations of addition: 1-2-3-4 where 1 is at L/D = 3.5, 2 is at L/D = 7, 3 is at L/D = 24.5, and 4 is at L/D = 35
N: nylons,
S: stabilizers,
P: plasticizer,
E: Exxelor 1840,
R: rubber of BIMS

TABLE 8

F4 DVA prepared by various twin-screw mixing methods

| | Comparative Example 4 | Example 14 | Example 15 | Example 16 | Example 17 |
|---|---|---|---|---|---|
| Formulation | F4 | F4 | F4 | F4 | F4 |
| BIMS pre-compounded | Yes | Yes | Yes | Yes | Yes |
| Nylon pre-blended | Yes (N/P/S) | No | No | No | No |
| Two-step mixing | Yes | No | No | No | No |
| One-step mixing | No | Method 1 | Method 3 | Method 4 | Method 5 |
| Adding sequence 1-2-3-4 | Not applicable | N/S-P-R/E | N/S-P-R-E | N/S-P-E-R | N/S/R-P-E |
| Pellet quality | Good | Average | Good | NG (PI) | NG (PI) |
| Morphology | Good | Poor | Good | NG | NG |
| Cast film quality | Good | Poor | Good | NG | NG |

Locations of addition: 1-2-3-4 where 1 is at L/D = 3.5, 2 is at L/D = 7, 3 is at L/D = 24.5, and 4 is at L/D = 35
N: nylons,
S: stabilizers,
P: plasticizer,
E: Exxelor 1840,
R: rubber of BIMS Additionally, one can further reduce the distance between the addition locations of BIMS and either AR201 or Exxelor 1840. As shown in Table 9, excellent morphologies could be obtained in thermoplastic elastomer compositions containing either AR201 or Exxelor 1840 with BIMS being added only 7 L/D upstream from either AR201 or Exxelor 1840. Therefore, in order to deliver excellent dispersion morphologies in these DVA using one-step, twin-screw extrusion mixing, the nylon is preferably added first, most preferably along with stabilizers and plasticizer for the nylon. Among the elastomers, the elastomer with lowest grafting efficiency is preferably added first and the higher grafting efficiency elastomer preferably added last. Sufficient spacing between these low and high grafting efficiency elastomer addition locations is preferred in order to achieve good mixing and morphology. Spacing between the addition of such elastomers is preferably greater than about L/D=6.

TABLE 9

F4 DVA prepared by various twin-screw mixing methods

| | Comparative Example 5 | Example 19 | Example 20 |
|---|---|---|---|
| Formulation | F5 | F5 | F4 |
| BIMS pre-compounded | Yes | Yes | Yes |
| Nylon pre-blended | Yes (N/P/S) | No | No |
| Two-step mixing | Yes | No | No |
| One-step mixing | No | Method 6 | Method 6 |
| Addition sequence: 1-2-3*-4 | Not applicable | N/S-P-R-A | N/S-P-R-E |
| Pellet quality | Good | Good | Good |
| Morphology | Good | Good | Good |

TABLE 9-continued

F4 DVA prepared by various twin-screw mixing methods

|  | Comparative Example 5 | Example 19 | Example 20 |
|---|---|---|---|
| Cast film quality | Good | Good | Good |

N: nylons,
S: stabilizers,
P: plasticizer,
E: Exxelor 1840,
R: rubber of BIMS
Locations of addition: 1-2-3*-4 where 1 is at L/D = 3.5, 2 is at L/D = 7, 3* is at L/D = 28, and 4 is at L/D = 35.

Any range of numbers recited in the specification hereinabove or in the paragraphs and claims hereinafter, referring to various aspects of the invention, such as that representing a particular set of properties, units of measure, conditions, physical states or percentages, is intended to literally incorporate expressly herein by reference or otherwise, any number falling within such range, including any subset of numbers or ranges subsumed within any range so recited. Furthermore, the term "about" when used as a modifier for, or in conjunction with, a variable, characteristic or condition is intended to convey that the numbers, ranges, characteristics and conditions disclosed herein are flexible and that practice of the present invention by those skilled in the art using temperatures, concentrations, amounts, contents, carbon numbers and properties that are outside of the range or different from a single value, will achieve the desired result, namely, a thermoplastic elastomer composition exhibiting a desirable morphology comprising one or more dispersed elastomers in a thermoplastic matrix, preferably produced in an efficient, more preferably a one-step, extruder mixing process.

All documents described herein are incorporated by reference herein, including any priority documents and/or testing procedures. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A dynamic vulcanization process conducted in a mixer capable of applying shear to polymer components at elevated temperature for producing a thermoplastic elastomer composition, said composition comprising dispersed particles of at least one first elastomer or rubber comprising halogenated isobutylene-containing elastomer and dispersed particles of at least one second elastomer or rubber having at least one functional group capable of reacting with and grafting to a polyamide, said particles of said at least one first and at least one second elastomers dispersed in a continuous thermoplastic polyamide matrix comprising at least one polyamide selected from the group consisting of nylon homopolymers, and nylon copolymers, said process comprising the steps of:
   (1) dispersing, in said halogenated elastomer, at least one curing agent or cure system suitable for crosslinking said halogenated elastomer to obtain a pre-compounded halogenated elastomer composition using shear conditions, mixing time and a temperature sufficient to substantially uniformly disperse said curing agent or cure system, but insufficient to cause substantial crosslinking of said elastomer that would prevent its subsequent flow and dispersion when added to polyamide under conditions of elevated temperature and shear;
   (2) introducing said at least one polyamide and optionally at least one nylon thermal stabilizer or oxidative stabilizer or light stabilizer or combination of them, into said mixer and applying sufficient shear and heat to cause the nylon to melt and said optional stabilizer to be dispersed in said polyamide and form a polyamide mixture;
   (3) introducing at least one nylon plasticizer in an amount sufficient to cause the viscosity of said nylon mixture to substantially match the viscosity of said pre-compounded halogenated elastomer at the temperature and under the shear conditions present in said mixer;
   (4) introducing said pre-compounded halogenated elastomer into the polyamide mixture in said mixer and applying heat and shear in sufficient quantity to initiate dynamic vulcanization of said halogenated elastomer; and
   (5) introducing said second elastomer and continuing the heating and shearing to substantially disperse said second elastomer and substantially complete said dynamic vulcanization of said halogenated elastomer; and
delivering said dynamically vulcanized thermoplastic elastomer composition from said mixer.

2. The process according to claim 1, wherein said extruder is a twin-screw extruder.

3. The process according to claim 2, wherein said extruder has a characteristic value of L/D, wherein L is the flighted length of the at least one extruder screw and D is the maximum diameter of said at least one extruder screw in its flighted portion and the extruded has an L/D of about 25 to about 60.

4. The process according to claim 3, wherein said pre-compounded halogenated elastomer is fed to said extruder at an upstream position equal to or less than one-half of the overall L/D of said extruder and said second elastomer is fed to said extruder at an downstream position equal to or greater than one-half of the overall L/D of said extruder, provided that the feed positions of said pre-compounded halogenated elastomer and said second elastomer are separated from one another by a distance along said extruder of at least about L/D=6.

5. The process according to claim 1 further comprising pelletizing and cooling pellets formed of said pre-compounded halogenated elastomer composition in step 1.

6. The process according to claim 1 wherein said halogenated elastomer is dispersed in said polyamide matrix in the form of particles having an average size of about 0.1 microns to about 1.0 microns and said second elastomer is dispersed in said polyamide matrix as particles having an average size of about 0.1 microns to about 1.0 microns.

7. The process according to claim 1, wherein said second elastomer or rubber is selected from the group consisting of ethylenically unsaturated nitrile-conjugated diene-based high saturation copolymer rubbers (HNBR), epoxylated natural rubbers (ENR), nitrile butadiene rubbers (NBR), hydrin rubbers, acryl rubbers, maleic anhydride grafted acrylonitrile-butadiene-styrene rubbers (ABS), maleic anhydride grafted ethylene-propylene-diene rubbers (EPDM), maleic anhydride grafted styrene-ethylene/butadiene-styrene rubbers (SEBS), maleated ethylene-propylene copolymer rubbers (EPM), maleated ethylene-butene rubbers, maleated ethylene-hexene rubbers, maleated ethylene-octene rubbers, maleated ethylene-decene rubbers, maleated ethylene-vinyl acetate copolymers, maleated ethylene-methyl acrylate copolymers, maleated ethylene-ethyl acrylate copolymers, maleated ethylene-acrylic acid copolymers, EPDM/styrene copolymers, maleic acid modified EPDM/styrene copolymers, EPDM/acrylonitrile graft copolymers, maleic acid modified EPDM/acrylonitrile graft copolymers, styrene/maleic acid copolymers, reactive phenoxy thermoplastic resins, maleated isobutylene-isoprene copolymers, maleated isobutylene-paramethylstyrene copolymers, maleated halogenated isobutylene-isoprene copolymers, maleated star branched butyl (SBB) copolymers, maleated BIMS copolymers, and mixtures thereof.

8. The process according to claim 7, wherein said second elastomer or rubber comprises maleic anhydride present at in an amount less than an amount selected from the group consisting of 50 wt %, 45 wt %, 40 wt %, 35 wt %, 30 wt %, 25 wt %, 20 wt %, 15 wt %, 10 wt %, 9 wt %, 8 wt %, 7 wt %, 6 wt %, 5 wt %, 4 wt %, 3 wt %, and 2 wt %.

9. The process according to claim 1, wherein said substantially complete dynamic vulcanization corresponds to a degree of cure selected from the group consisting of about 60% to greater than about 95%; about 65% to about 95%; about 70% to about 95%; about 75% to greater than about 90%; about 80% to about 98%; about 85% to about 95%; and about 85% to about 99%.

10. The process according to claim 9 wherein said degree of cure is at least about 80%.

11. The process according to claim 1 wherein said elastomer containing composition further comprises at least one component selected from the group consisting of fillers and plasticizers.

12. The process according to claim 1 wherein said polyamide is selected from the group consisting of nylon 11, nylon 12, nylon 6/66 copolymer and mixtures thereof.

13. The process according to claim 1 wherein said at least one halogenated isobutylene-containing elastomer or rubber is selected from the group consisting of halogenated butyl rubber, halogenated isoolefin/para-alkylstyrene copolymer, halogenated isobutylene-p-methylstyrene-isoprene copolymer, halogenated branched butyl rubber and halogenated star-branched butyl rubber.

14. The process according to claim 12 wherein said halogenated butyl rubber comprises a high content of the following halogenated structure, where X represents a halogen:

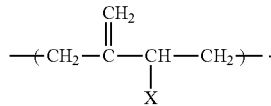

15. The process according to claim 13, wherein the halogen is selected from the group consisting of bromine and chlorine.

16. The process according to claim 13 wherein said halogenated isoolefin/para-alkylstyrene copolymer copolymers comprises a $C_4$ to $C_7$ isoolefin.

17. The process according to claim 16 wherein said halogenated isoolefin/para-alkylstyrene copolymer comprises a halogenated poly(isobutylene-co-p-methylstyrene) copolymer.

18. The process according to claim 17 wherein said halogen is bromine.

19. A dynamic vulcanization process conducted in a twin-screw, extruder mixer having a length to diameter (L/D) screw ratio of 49 and capable of applying shear, heat and cooling to polymer and other components for producing a thermoplastic elastomer composition, said composition comprising dynamically vulcanized particles of brominated poly(isobutylene-co-paramethylstyrene) (BIMS) rubber and particles of maleated ethylene-octene copolymer rubber, each of said particles dispersed in a continuous thermoplastic nylon 6/66 copolymer resin matrix, said process comprising the steps of:
  (1) dispersing, in 100 parts by weight BIMS rubber, a cure system comprising a mixture of 0.15 parts zinc oxide, 0.60 parts stearic acid and 0.30 parts zinc stearate, to thereby obtain a pre-compounded BIMS composition and mixing in an internal mixer at 40 RPM, 90° C. for 3.5 minutes to substantially uniformly disperse said cure system, but insufficient to cause substantial crosslinking of said BIMS that would prevent its subsequent flow under conditions of elevated temperature and shear, and pelletizing and cooling said pre-compounded BIMS;
  (2) introducing, into said extruder at L/D=3.5, 62.4 parts nylon 6/66 copolymer and a mixture of 0.47 parts nylon thermal, oxidative, light stabilizers and applying sufficient shear and heat to cause the nylon to melt and the stabilizers to be dispersed in said nylon and form a nylon mixture;
  (3) introducing, at L/D=7, 26.8 parts of the nylon plasticizer N-butylsulfonamide;
  (4) introducing, at L/D=28, pellets comprising said pre-compounded halogenated elastomer according to the composition shown in (1) above, and applying heat and shear in sufficient quantity to initiate dynamic vulcanization of said halogenated elastomer;
  (5) introducing, at L/D=35, 10.0 parts maleated ethylene-octene copolymer rubber and continuing the heating and shearing to substantially disperse said second elastomer and substantially complete said dynamic vulcanization of said BIMS; and
delivering said dynamically vulcanized thermoplastic elastomer composition from said mixer.

* * * * *

UNITED STATES PATENT AND TRADEMARK OFFICE
CERTIFICATE OF CORRECTION

PATENT NO. : 8,450,396 B2
APPLICATION NO. : 12/682490
DATED : May 28, 2013
INVENTOR(S) : Tsou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 273 days.

Signed and Sealed this
Eighth Day of September, 2015

Michelle K. Lee
*Director of the United States Patent and Trademark Office*